(12) United States Patent
Lee et al.

(10) Patent No.: US 11,521,038 B2
(45) Date of Patent: Dec. 6, 2022

(54) ELECTRONIC APPARATUS AND CONTROL METHOD THEREOF

(71) Applicant: SAMSUNG ELECTRONICS CO., LTD., Suwon-si (KR)

(72) Inventors: Jongryul Lee, Suwon-si (KR); Jaedeok Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 664 days.

(21) Appl. No.: 16/516,387

(22) Filed: Jul. 19, 2019

(65) Prior Publication Data

US 2020/0026977 A1    Jan. 23, 2020

(30) Foreign Application Priority Data

Jul. 19, 2018    (KR) .................. 10-2018-0084311

(51) Int. Cl.
| | |
|---|---|
| G06N 3/02 | (2006.01) |
| G06F 9/50 | (2006.01) |
| G06F 3/048 | (2013.01) |
| G10L 17/00 | (2013.01) |
| G06V 40/16 | (2022.01) |

(52) U.S. Cl.
CPC .............. G06N 3/02 (2013.01); G06F 3/048 (2013.01); G06F 9/5061 (2013.01); G06V 40/16 (2022.01); G10L 17/00 (2013.01)

(58) Field of Classification Search
CPC .................................. G06G 7/00; G06N 3/02
See application file for complete search history.

(56) References Cited

U.S. PATENT DOCUMENTS

| | | |
|---|---|---|
| 5,550,970 A | 8/1996 | Cline et al. |
| 6,175,772 B1 | 1/2001 | Kamiya et al. |
| 6,570,555 B1 | 5/2003 | Prevost et al. |
| 6,967,455 B2 | 11/2005 | Nakadai et al. |

(Continued)

FOREIGN PATENT DOCUMENTS

| | | |
|---|---|---|
| CN | 102945672 A | 2/2013 |
| CN | 103914032 A | 7/2014 |

(Continued)

OTHER PUBLICATIONS

Office Action dated Sep. 15, 2021 by the United States Patent and Trademark Office in U.S. Appl. No. 16/893,643.

(Continued)

*Primary Examiner* — Olisa Anwah
(74) *Attorney, Agent, or Firm* — Sughrue Mion, PLLC

(57) ABSTRACT

A method for controlling an electronic apparatus includes storing a plurality of artificial intelligence models in a first memory, based on receiving a control signal for loading a first artificial intelligence model among the plurality of stored artificial intelligence models into a second memory, identifying an available memory size of the second memory, and based on a size of the first artificial intelligence model being larger than the available memory size of the second memory, obtaining a first compression artificial intelligence model by compressing the first artificial intelligence model based om the available memory size of the second memory, and loading the first compression artificial intelligence model into the second memory.

20 Claims, 20 Drawing Sheets

(56) References Cited

U.S. PATENT DOCUMENTS

| | | | |
|---|---|---|---|
| 8,661,120 | B2 | 2/2014 | Atchison et al. |
| 8,788,257 | B1 | 7/2014 | Su et al. |
| 9,398,335 | B2 | 7/2016 | Hough et al. |
| 9,955,210 | B2 | 4/2018 | Wang et al. |
| 10,269,344 | B2 | 4/2019 | Lee et al. |
| 10,719,293 | B2 | 7/2020 | Li |
| 2003/0147624 | A1 | 8/2003 | Trajkovic et al. |
| 2003/0189674 | A1 | 10/2003 | Inoue et al. |
| 2005/0210061 | A1 | 9/2005 | Chang et al. |
| 2006/0252457 | A1 | 11/2006 | Schrager |
| 2007/0038332 | A1 | 2/2007 | Ozaki et al. |
| 2007/0271595 | A1 | 11/2007 | Jin et al. |
| 2009/0175510 | A1 | 7/2009 | Grim, III et al. |
| 2009/0307718 | A1 | 12/2009 | Tong |
| 2010/0037300 | A1 | 2/2010 | Jin et al. |
| 2010/0217981 | A1 | 8/2010 | Jin et al. |
| 2011/0026737 | A1 | 2/2011 | Park |
| 2011/0109539 | A1 | 5/2011 | Wu et al. |
| 2011/0119346 | A1 | 5/2011 | Kim et al. |
| 2011/0141307 | A1 | 6/2011 | Seto et al. |
| 2012/0151327 | A1 | 6/2012 | Jin et al. |
| 2012/0163677 | A1 | 6/2012 | Thorn |
| 2012/0198099 | A1 | 8/2012 | Kwon et al. |
| 2013/0010207 | A1 | 1/2013 | Valik et al. |
| 2013/0127712 | A1 | 5/2013 | Matsubayashi |
| 2013/0141572 | A1 | 6/2013 | Torres et al. |
| 2013/0147629 | A1 | 6/2013 | Kim |
| 2013/0321256 | A1 | 12/2013 | Kim |
| 2014/0070925 | A1 | 3/2014 | Shin et al. |
| 2014/0163976 | A1 | 6/2014 | Park et al. |
| 2014/0188485 | A1 | 7/2014 | Kim et al. |
| 2014/0229727 | A1 | 8/2014 | Jun |
| 2014/0289683 | A1 | 9/2014 | Park |
| 2014/0300684 | A1 | 10/2014 | Fagadar-Cosma et al. |
| 2015/0015690 | A1 | 1/2015 | Roh et al. |
| 2015/0019710 | A1 | 1/2015 | Shaashua et al. |
| 2015/0169336 | A1 | 6/2015 | Harper et al. |
| 2015/0222450 | A1 | 8/2015 | Ko et al. |
| 2015/0222948 | A1 | 8/2015 | Wang et al. |
| 2015/0309809 | A1 | 10/2015 | Shin et al. |
| 2015/0319614 | A1 | 11/2015 | Cho |
| 2015/0339059 | A1 | 11/2015 | Kang et al. |
| 2016/0170710 | A1 | 6/2016 | Kim et al. |
| 2016/0217369 | A1* | 7/2016 | Annapureddy ........ G06N 3/082 |
| 2016/0349127 | A1 | 12/2016 | Britt |
| 2016/0358070 | A1 | 12/2016 | Brothers et al. |
| 2017/0004828 | A1 | 1/2017 | Lee et al. |
| 2017/0132511 | A1* | 5/2017 | Gong .................... G06Q 50/01 |
| 2017/0337919 | A1 | 11/2017 | Kato et al. |
| 2018/0046894 | A1 | 2/2018 | Yao |
| 2018/0046895 | A1* | 2/2018 | Xie ......................... G06N 3/04 |
| 2018/0107925 | A1 | 4/2018 | Choi et al. |
| 2018/0122379 | A1 | 5/2018 | Sohn et al. |
| 2018/0260189 | A1 | 9/2018 | Li |
| 2018/0330275 | A1* | 11/2018 | Jain ......................... G06N 5/04 |
| 2019/0080239 | A1* | 3/2019 | Yang .................... G06N 3/082 |
| 2019/0086988 | A1* | 3/2019 | He ........................ G06F 1/3212 |
| 2019/0156817 | A1* | 5/2019 | Li ........................ H03M 7/3082 |
| 2019/0206090 | A1* | 7/2019 | Ray ...................... G06F 12/023 |
| 2019/0267004 | A1 | 8/2019 | Lee et al. |
| 2019/0279092 | A1* | 9/2019 | Sandler .................. G06N 3/084 |
| 2019/0318245 | A1 | 10/2019 | Song et al. |
| 2020/0301663 | A1 | 9/2020 | Li |
| 2020/0302292 | A1* | 9/2020 | Tseng ....................... G06N 3/08 |
| 2021/0174249 | A1* | 6/2021 | Hernandez Herranz ................... G06N 20/00 |
| 2022/0076124 | A1* | 3/2022 | Timm .................... G06N 3/082 |

FOREIGN PATENT DOCUMENTS

| | | |
|---|---|---|
| CN | 105204743 A | 12/2015 |
| CN | 105379299 A | 3/2016 |
| CN | 105446146 A | 3/2016 |
| CN | 105493440 A | 4/2016 |
| CN | 105830048 A | 8/2016 |
| CN | 105874405 A | 8/2016 |
| EP | 3 179 415 A1 | 6/2017 |
| JP | 2002-55874 A | 2/2002 |
| JP | 2009-211494 A | 9/2009 |
| JP | 2009-230831 A | 10/2009 |
| JP | 2010-511958 A | 4/2010 |
| KR | 10-2003-0013732 A | 2/2003 |
| KR | 10-0969447 B1 | 7/2010 |
| KR | 10-2014-0039961 A | 4/2014 |
| KR | 10-2015-0068013 A | 6/2015 |
| KR | 10-2015-0136811 A | 12/2015 |
| KR | 10-2016-0143548 A | 12/2016 |
| KR | 10-2018-0049787 A | 5/2018 |
| WO | 2008069519 A1 | 6/2008 |
| WO | 2010/129056 A1 | 11/2010 |
| WO | 2015/016604 A1 | 2/2015 |
| WO | 2015/020406 A1 | 2/2015 |
| WO | 2015/094169 A1 | 6/2015 |
| WO | 2015088141 A1 | 6/2015 |
| WO | 2018/121282 A1 | 7/2018 |

OTHER PUBLICATIONS

Office Action dated Jan. 30, 2020, issued by the United States Patent and Trademark Office in counterpart U.S. Appl. No. 15/803,051.
Commuhication dated Oct. 4, 2019 by the European Patent Office in counterpart European Patent Application No. 17866553.5.
Communication dated Oct. 7, 2019 by the United States Patent and Trademark Office in counterpart U.S. Appl. No. 15/803,051.
Communication (PCT/ISA/210) dated Oct. 29, 2019 by the International Searching Authority in counterpart International Patent Application No. PCT/KR2019/008872.
Communication (PCT/ISA/237) dated Oct. 29, 2019 by the International Searching Authority in counterpart International Patent Application No. PCT/KR2019/008872.
Kaist "Development of Deep Running Artificial Intelligence Semiconductors for Mobile Devices", Ministry of Science and ICT, Feb. 26, 2018, (21 pages total).
Written Opinion (PCT/ISA/237) issued by the International Searching Authority in corresponding International Application No. PCT/KR2017/012271, dated Feb. 2, 2018.
International Search Report (PCT/ISA/210), issued by International Searching Authority in corresponding International Application No. PCT/KR2017/012271, dated Feb. 2, 2018.
Communication dated Jun. 26, 2019, issued by the USPTO in counterpart U.S. Appl. No. 15/803,051.
Communication dated Apr. 22, 2021, issued by the European Patent Office in European Application No. 19838211.1.
Communication dated Mar. 1, 2021, issued by the European Patent Office in European Application No. 17866553.5.
Communication dated Mar. 1, 2021, issued by the Intellectual Property India in Indian Application No. 201917021785.
Dongsoo Lee et al., "Viterbi-Based Pruning For Sparse Matrix With Fixed And High Index Compression Ratio", ICLR, Feb. 16, 2018, pp. 1-16 (16 pages total).
Communication dated Dec. 14, 2021, issued by the China National Intellectual Property Administration in Chinese Application No. 201780081769.2.
Summons to Oral Proceedings dated Apr. 6, 2022 issued by the European Patent Office in European Application No. 17866553.5.
Office Action dated Mar. 8, 2022, issued by the United States Patent and Trademark Office in U.S. Appl. No. 16/893,643.
Office Action dated Jun. 15, 2022 by the United States Patent and Trademark Office in U.S. Appl. No. 16/893,643.
Communication dated Jul. 29, 2022 by the Korean Intellectual Property Office in Korean Patent Application No. 10-2017-0106127.
Communication dated Aug. 4, 2022 by the State Intellectual Property Office of P.R. China in Chinese Patent Application No. 201780081769.2.

* cited by examiner

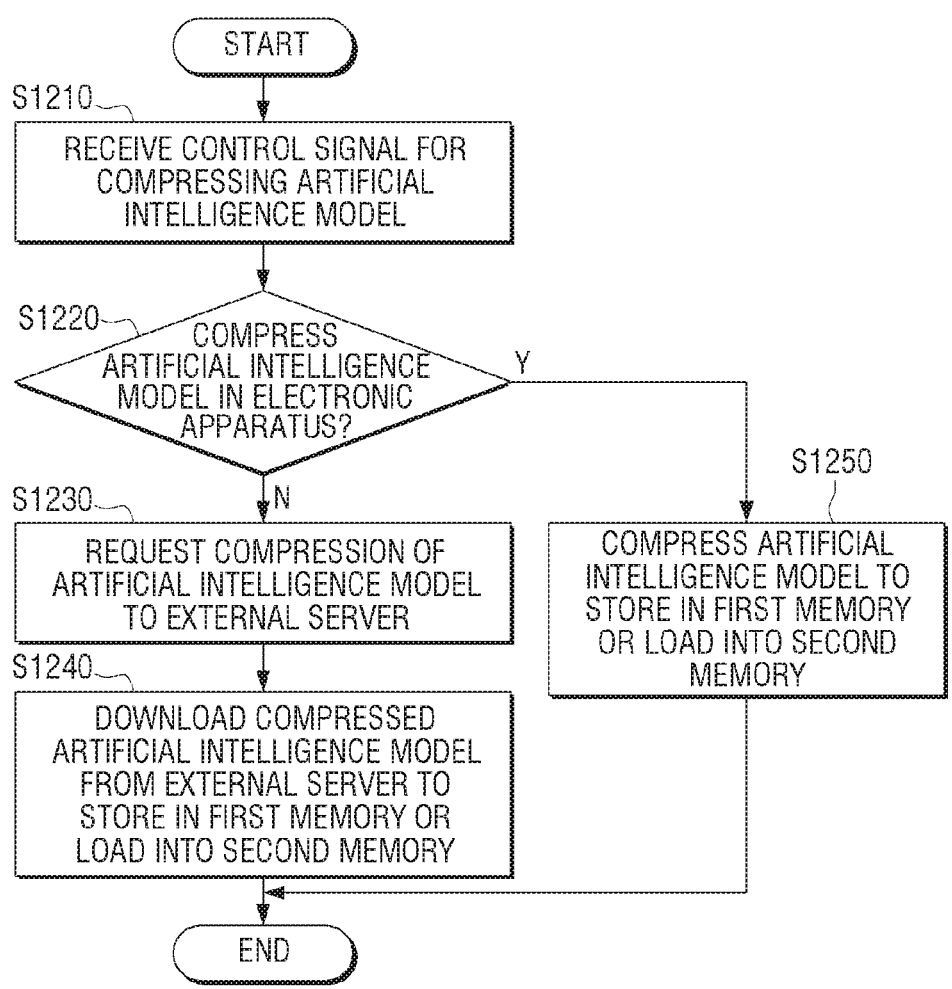

ELECTRONIC APPARATUS AND CONTROL METHOD THEREOF

CROSS-REFERENCE TO RELATED APPLICATION(S)

This application is based on and claims priority under 35 U.S.C. § 119 to Korean Patent Application No. 10-2018-0084311, filed on Jul. 19, 2018, in the Korean Intellectual Property Office, the disclosure of which is incorporated by reference herein in its entirety.

BACKGROUND

1. Field

The disclosure relates to an electronic apparatus and a control method thereof, and more particularly, to an electronic apparatus for efficiently using a plurality of artificial intelligence models and a control method thereof.

Additionally, the disclosure relates to an artificial intelligence (AI) system that simulates functions of the human brain such as cognition, determination, etc., using a machine learning algorithm, and an application thereof.

2. Description of the Related Art

Artificial intelligence (AI) systems are computer systems that implement human-level intelligence. An artificial intelligence system is a system in which a machine learns, judges, and becomes smart, unlike a related art rules-based smart system. The more the artificial intelligence system is used, the higher the recognition rate and the better understanding of a user's preferences. Thus, the related art rule-based smart system has been gradually replaced with a deep-learning based artificial intelligence system.

Artificial intelligence technology consists of machine learning (e.g., deep-learning) and element technologies that use machine learning.

Machine learning is an algorithm technology that classifies/trains the characteristics of input data by itself. Element technology is a technology that simulates functions, such as recognition and judgment of the human brain, using a machine learning algorithm such as deep learning and includes linguistic understanding, visual understanding, reasoning/prediction, knowledge representation, motion control, etc.

Artificial intelligence technology may be applied to various fields, examples of which are described below. Linguistic understanding is a technology for recognizing and applying/processing human language/characters, including natural language processing, machine translation, dialogue system, query response, speech recognition/synthesis, and the like. Visual comprehension is a technology for recognizing and processing an object as if perceived by a human being, including object recognition, object tracking, image search, human recognition, scene understanding, spatial understanding, image enhancement, etc. Inference prediction is a technology for judging and logically inferring and predicting information, including knowledge/probability-based reasoning, optimization prediction, preference-bases planning, and recommendations. Knowledge representation is a technology for automating human experience information into knowledge data, including knowledge building (data generation/classification) and knowledge management (data utilization). Motion control is a technology for controlling the autonomous movements of a device or object, e.g., travel of a vehicle and the motion of a robot, including motion control (navigation, collision and traveling), operation control (behavior control), and the like.

Recently, a variety of artificial intelligence models for various purposes may operate in a single device or application. However, a related art artificial intelligence technique requires a significant amount of time and a large storage capacity, and therefore it has not been feasible to efficiently use it in a user terminal device such as a smart phone.

SUMMARY

In accordance with an aspect of the disclosure, there is provided a method for controlling an electronic apparatus, the method including storing a plurality of artificial intelligence models in a first memory; based on receiving a control signal for loading a first artificial intelligence model among the plurality of stored artificial intelligence models into a second memory, identifying an available memory size of the second memory; and based on a size of the first artificial intelligence model being larger than the available memory size of the second memory, obtaining a first compression artificial intelligence model by compressing the first artificial intelligence model based on the available memory size of the second memory, and loading the first compression artificial intelligence model into the second memory.

The loading may include identifying whether a performance of the first compression artificial intelligence model satisfies a predetermined condition; based on the performance of the first compression artificial intelligence model satisfying the predetermined condition, loading the first compression artificial intelligence model into the second memory; and based on the first compression artificial intelligence model not satisfying the predetermined condition, obtaining a second compression artificial intelligence model obtained by compressing the first artificial intelligence model using a different method than the first compression artificial intelligence model, and loading the second compression artificial intelligence model into the second memory.

The performance of the first compression artificial intelligence model may be any one or any combination of a processor share rate of the first compression artificial intelligence model, the size of the first compression artificial intelligence model, and an accuracy of the first compression artificial intelligence model.

The method may further include, based on a plurality of compression artificial intelligence models obtained by compressing the first artificial intelligence model using a plurality of methods not satisfying the predetermined condition, displaying a message notifying that the predetermined condition is not satisfied.

The method may further include, based on the available memory size of the second memory being changed, obtaining a third compression artificial intelligence model by compressing the first artificial intelligence model based on the changed available memory size, and loading the third compression artificial intelligence model.

The method may further include, based on receiving a control signal for loading a second artificial intelligence model into the second memory, according to the available memory size of the second memory, loading a compression artificial intelligence model for the first artificial intelligence model obtained by compressing the first artificial intelligence model, and a compression artificial intelligence model for the second artificial intelligence model obtained by compressing the second artificial intelligence model.

The method may further include, based on a plurality of artificial intelligence models being loaded in the second memory, identifying a number of times of use of the plurality of artificial intelligence models loaded in the second memory, and based on the identified number of times of use, loading a compression artificial intelligence model for at least one of the plurality of artificial intelligence models.

The method may further include displaying a user interface (UI) for receiving a performance of at least one of the plurality of artificial intelligence models, wherein the first compression artificial intelligence model may be an artificial intelligence model compressed based on a performance input through the UI.

The storing may further include storing a plurality of compressed artificial intelligence models for the first artificial intelligence model in the first memory.

The first artificial intelligence model may be compressed using any one or any combination of Pruning, Quantization, Decomposition, and Knowledge Distillation.

In accordance with an aspect of the disclosure, there is provided an electronic apparatus including: a first memory configured to store a plurality of artificial intelligence models; a second memory configured to load at least one of the plurality of artificial intelligence models stored in the first memory; and a processor configured to: based on receiving a control signal for loading a first artificial intelligence model among the plurality of stored artificial intelligence models into the second memory, identify an available memory size of the second memory, and based on a size of the first artificial intelligence model being larger than the available memory size of the second memory, control to obtain a first compression artificial intelligence model by compressing the first artificial intelligence model based on the available memory size of the second memory, and load the first compression artificial intelligence model into the second memory.

The processor may be further configured to: identify whether a performance of the first compression artificial intelligence model satisfies a predetermined condition, based on the performance of the first compression artificial intelligence model satisfying the predetermined condition, load the first compression artificial intelligence model into the second memory, and based on the performance of the first compression artificial intelligence model not satisfying the predetermined condition, control to obtain a second compression artificial intelligence model by compressing the first artificial intelligence model using a different method than the first compression artificial intelligence model, and load the second compression artificial intelligence model into the second memory.

The performance of the first compression artificial intelligence model may be any one or any combination of a processor share rate of the first compression artificial intelligence model, the size of the first compression artificial intelligence model, and an accuracy of the first compression artificial intelligence model.

The electronic apparatus may further include a display, wherein the processor may be further configured to, based on a plurality of compression artificial intelligence models obtained by compressing the first artificial intelligence model using a plurality of methods not satisfying the predetermined condition, control the display to display a message notifying that the predetermined condition is not satisfied.

The processor may be further configured to, based on the available memory size of the second memory being changed, control to obtain a third compression artificial intelligence model by compressing the first artificial intelligence model based on the changed available memory size, and load the third compression artificial intelligence model.

The processor may be further configured to, based on a control signal for loading a second artificial intelligence model into the second memory being received, according to the available memory size of the second memory, control to load a compression artificial intelligence model for the first artificial intelligence model obtained by compressing the first artificial intelligence model, and a compression artificial intelligence model for the second artificial intelligence model obtained by compressing the second artificial intelligence model.

The processor may be further configured to, based on a plurality of artificial intelligence models being loaded in the second memory, identify a number of times of use of the plurality of artificial intelligence models loaded in the second memory, and load a compression artificial intelligence model for at least one of the plurality of artificial intelligence models based on the identified number of times of use.

The electronic apparatus may further include a display, wherein the processor may be further configured to control the display to display a user interface (UI) for receiving a performance of at least one of the plurality of artificial intelligence models, and wherein the first compression artificial intelligence model may be an artificial intelligence model compressed based on a performance input through the UI.

The processor may be further configured to control the first memory to store a plurality of compressed artificial intelligence models for the first artificial intelligence model in the first memory.

The first artificial intelligence model may be compressed using any one or any combination of Pruning, Quantization, Decomposition, and Knowledge Distillation.

BRIEF DESCRIPTION OF THE DRAWINGS

FIG. 12 is a flowchart to illustrate an operation of an electronic apparatus to download a compressed artificial intelligence model from an external server, according to an embodiment.

DETAILED DESCRIPTION OF EMBODIMENTS

Figure 1:
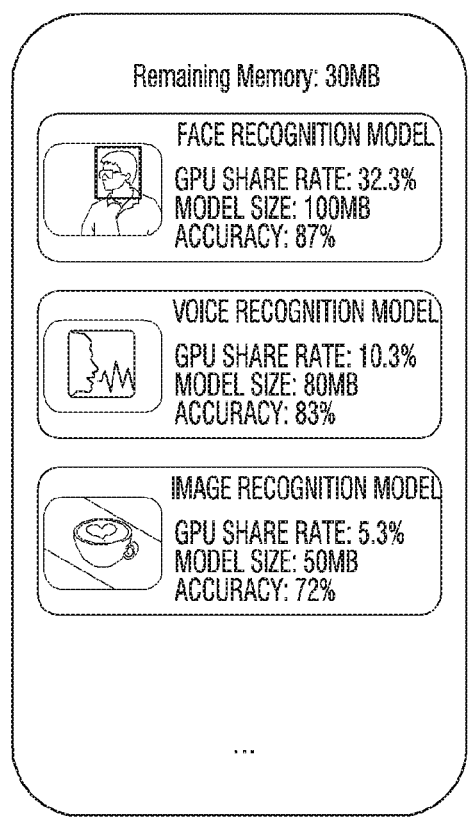
FIG. 1 is an example view to illustrate a method of an electronic apparatus for managing a plurality of artificial intelligence models, according to an embodiment.

The terms used in this specification will be briefly described, and the disclosure will be described in detail.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

The disclosure is not limited to an embodiment disclosed below and may be implemented in various forms and the scope of the disclosure is not limited to the following embodiments. In addition, all changes or modifications derived from the meaning and scope of the claims and their equivalents should be construed as being included within the scope of the disclosure. In the following description, the configuration which is publicly known but irrelevant to the gist of the disclosure could be omitted.

The terms such as "first," "second," and so on may be used to describe a variety of elements, but the elements should not be limited by these terms. The terms are used simply to distinguish one element from other elements.

The singular expression also includes the plural meaning as long as it does not mean differently in the context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In an example embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

Hereinafter, embodiments of the disclosure will be described in detail with reference to the accompanying drawings so that those skilled in the art can easily carry out the embodiments. However, the disclosure may be embodied in many different forms and is not limited to the embodiments described herein. To clearly illustrate the disclosure in the drawings, some of the elements that are not essential to the complete understanding of the disclosure are omitted for clarity, and like reference numerals refer to like elements throughout the specification.

An aspect of the embodiments relates to a method for efficiently using a plurality of artificial intelligence models in a limited memory capacity.

According to embodiments, an electronic apparatus compresses an artificial intelligence model in consideration of the performances of a plurality of artificial intelligence models.

FIG. 1 is an example view to illustrate a method of an electronic apparatus for managing a plurality of artificial intelligence models, according to an embodiment.

For example, according to an embodiment illustrated in FIG. 1, an electronic apparatus 100 uses a face recognition model, a voice recognition model, and an image recognition model. However, resources such as a memory capacity, a GPU/CPU model of the electronic apparatus 100 are limited, and the size of the artificial intelligence model could be large. Therefore, it would be difficult to use a plurality of artificial intelligence models as they are. Therefore, the electronic apparatus 100 may compress an artificial intelligence model for reducing the size of the artificial intelligence model. However, when the artificial intelligence model is compressed, the performance of the artificial intelligence model may be degraded. Generally, the degree of compression of the artificial intelligence model and the performance of the artificial intelligence model may have a trade-off relationship. Therefore, the electronic apparatus 100 may compress a specific artificial intelligence model based on the performance, and another artificial intelligence model based on the size. For example, the electronic apparatus 100 may place the worth on the performance of the frequently used artificial intelligence model, and may not compress or may compress less. However, the electronic apparatus 100 may compress a large portion of the artificial intelligence model that is not frequently used to reduce the size thereof although the performance is degraded. Therefore, the electronic apparatus 100 may determine how to compress an artificial intelligence model according to the memory status and the usability of the artificial intelligence model.

Figure 2:
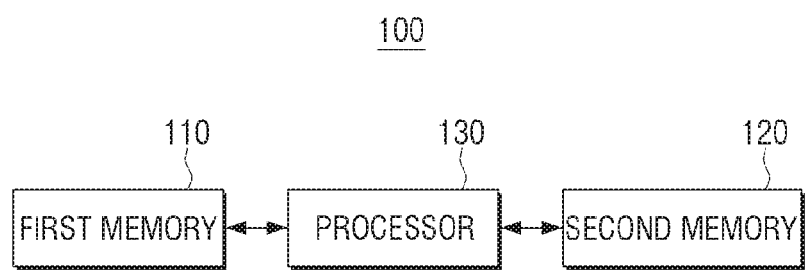
FIG. 2 is a schematic block diagram to illustrate a configuration of an electronic apparatus, according to an embodiment.

FIG. 2 is a schematic block diagram to illustrate a configuration of an electronic apparatus according to an embodiment.

Referring to FIG. 2, an electronic apparatus 100 may include a first memory 110, a second memory 120, and a processor 130.

The first memory 110 or the second memory 120, for example, may store commands or data related to at least one other constituent element of the electronic apparatus 100. According to an embodiment, the first memory 110 or the second memory 120 may store software and/or programs. The programs, for example, may include kernel, middleware, application programming interface (API) and/or application program (or "application"), etc. At least part of the kernel, middleware, application programming interface (API) may be referred to as an operation system. Kernel, for example, may control or manage system resources to be used for executing operations or functions embodied in other programs, and the middleware, for example, may render the API or the application program to communicate with the kernel and transceive data.

The first memory 110 may be configured to store a plurality of artificial intelligence models. When the electronic apparatus 100 uses one of a plurality of stored artificial intelligence models, the first memory 110 may transmit the artificial intelligence model stored in the first memory to the second memory 120. The first memory 110 may consist of an auxiliary memory device or a second memory device. The first memory 110 may be a nonvolatile memory such as a hard disk drive (HDD), a solid state drive (SSD), a universal serial bus (USB), or an optical disk.

The second memory 120 may receive and load the artificial intelligence model from the first memory 110. The second memory 120 may consist of a main memory device and a first memory device. The first memory 110 may consist of a RAM or a ROM.

The second memory 120 may have a smaller memory size than the first memory 110, and the memory size of the artificial intelligence model may be large. Therefore, it may be difficult for the second memory 120 to store the artificial intelligence models stored in the first memory 110. Therefore, as described below, the processor 130 may compress the artificial intelligence model and load it to the second memory 120.

The processor 130, for example, may control a plurality of hardware of software constituent elements connected to the processor 130, and perform various data processing and calculations. The processor 130, for example, may be embodied as system on chip (SoC). According to an embodiment, the processor 130 may further include a graphic processing unit (GPU) and/or an image signal processor. The processor 130 may load commands or data received from the first memory 110 to the second memory 120 for processing, and store result data in the first memory 110.

The processor 130 may include a processor for Artificial Intelligence (AI) only, or may be manufactured as a part of an existing general processor (e.g., a CPU or an application processor), or may include a graphic processor (e.g., a GPU). The processor for Artificial Intelligence (AI) only may be a processor specialized for probability operation having a higher parallel processing performance than the related art general processor, thereby quickly performing an arithmetic operation in the artificial intelligence field such as machine training.

The processor 130 may control the first memory 110 to store the plurality of artificial intelligence models. In a state in which the plurality of artificial intelligence models are stored in the first memory 110, a control signal for loading the first artificial intelligence model is received among the plurality of artificial intelligence models, and the processor 130 may identify the size of the memory than can be used of the second memory 120. The control signal for loading the first artificial intelligence model may be generated in various cases such as when a user command for using the first artificial intelligence model, a predetermined state for using the first artificial intelligence model, etc., occurs. For example, the control signal for loading the first artificial intelligence model may be generated when a user command for executing an application using the first artificial intelligence model is input. The control signal for loading the first artificial intelligence model may be generated when the first artificial intelligence model needs to be used in a specific situation (e.g., voice input, message reception, receiving a call from a user, image input, specific time, etc.)

When the size of the first artificial intelligence model is greater than the size of an available memory size of the second memory 120, the processor 130 may load a first compression artificial intelligence model that compresses the first artificial intelligence model based on the available memory size to the second memory 120. The first compression artificial intelligence model may be compressed by the processor 130, but is not limited thereto. For example, the first compression artificial intelligence model may be one of the compression artificial intelligence models pre-stored in the first memory 110.

The processor 130 may identify whether the performance of the first compression artificial intelligence model satisfies predetermined conditions. The performance of the first compression artificial intelligence model may be one of a processor share (CPU/GPU share) of the first compression artificial intelligence model, the size of the first compression artificial intelligence model, and the accuracy of the first compression artificial intelligence model. The predetermined condition may be a condition generated based on the performance of the first compression artificial intelligence model. However, the performance of the artificial intelligence model is not limited to the above-described example. There could be performances based on various indicators according to the type of the artificial intelligence model. For example, when the artificial intelligence model is an artificial intelligence model for sentence translation, the performance of the artificial intelligence model could be the performance calculated through Bilingual Evaluation Understudy (BLEU) Score.

The predetermined condition for the first compression artificial intelligence model may be one of the conditions of processor 130 share rate of 20%, the first compression artificial intelligence model of 128 Mega Byte (MB) or less, or the accuracy of 80% or more. These are merely examples and embodiments are not limited to these examples.

The processor 130 share rate of the artificial intelligence model may indicate a ratio of the amount of calculations for calculating the artificial intelligence model to the total amount of calculations of the processor 130. The processor 130 share rate may indicate a relative ratio for the artificial intelligence model. According to an embodiment, the above-described relative share rate is a basis, but is not limited thereto. The electronic apparatus 100 may identify a predetermined condition based on the absolute calculation amount necessary for calculating the artificial intelligence model instead of the processor 130 share rate.

If the performance of the first compression artificial intelligence model satisfies a predetermined condition, the processor 130 may load the first compression artificial intelligence model into the second memory 120. If the performance of the first compression artificial intelligence model fails to satisfy the predetermined condition, the processor 130 may load a second compression artificial intelligence model obtained by compressing the first artificial intelligence model in a different way to the second memory 120. The processor 130 may load the second compression artificial intelligence model that satisfies the predetermined condition compressed in a way different from the first compression artificial intelligence model into the second memory 120.

If the second compression artificial intelligence model fails to satisfy the predetermined condition, the processor 130 may identify whether the compression artificial intelligence model obtained by compressing the first artificial intelligence model in another different way satisfies the predetermined condition. If there is a compression artificial intelligence model that satisfies the predetermined condition, the processor 130 may load the compression artificial intelligence model that satisfies the predetermined condition to the second memory 120.

However, if a plurality of compression artificial intelligence models obtained by compressing the first artificial intelligence model in a plurality of ways fail to satisfy the predetermined condition, the processor 130 may output a message notifying that the artificial intelligence model fails to satisfy the predetermined condition. For example, if the first artificial intelligence model is compressed for a predetermined number of times (for example, 10 times), but there is no compression artificial intelligence model that satisfies the predetermined condition, the processor 130 may output a message that notifies that there is no compression artificial intelligence model that satisfies the predetermined condition. The processor 130 may not load the compression artificial intelligence model for the first artificial intelligence model into the second memory 120. The processor 130 may load a compression artificial intelligence model most similar to the predetermined condition among a plurality of compression artificial intelligence models generated with respect to the first artificial intelligence model to the second memory 120, and output a message that notifies that there is no compression artificial intelligence model that satisfies the predetermined condition.

When the available memory size of the second memory 120 is changed, the processor 130 may load the third artificial intelligence model obtained by compressing the first artificial intelligence model based on the changed memory size to the second memory 120. For example, when the size of the available memory of the second memory 120 is increased, the processor 130 may load the third compression artificial intelligence model generated based on the increased size of the memory to increase the accuracy of the first artificial intelligence model to the second memory 120. The third compression artificial intelligence model may have better performance compared to the first compression artificial intelligence model or the second compression artificial intelligence model.

When a control signal for loading the second artificial intelligence model to the second memory 120 is received, the processor 130 may load the first artificial intelligence model, the compression artificial intelligence model for the first artificial intelligence model obtained by compressing the second artificial intelligence model, and the compression artificial intelligence model for the second artificial intelligence model based on the size of the available memory of the second memory 120.

For example, when a control signal for loading the second artificial intelligence model is received in a state in which the first compression artificial intelligence model (or the second compression artificial intelligence model) is loaded to the second memory 120, the processor 130 may load the compression artificial intelligence model of the second artificial intelligence model to the second memory 120 based on the size of the available memory.

For example, if the size of the available memory of the second memory 120 is not enough to compress and load the second artificial intelligence model in a state in which the first compression artificial intelligence model (or the second compression artificial intelligence model) is loaded to the second memory 120. The processor 130 may load the first artificial intelligence model, the compression artificial intelligence model for the first artificial intelligence model obtained by compressing the second artificial intelligence model, and the compression artificial intelligence model for the second artificial intelligence model. The processor 130 may load another compression artificial intelligence model, not the first artificial intelligence model that is pre-loaded in the second memory 120 (the first compression artificial intelligence model or the second compression artificial intelligence model) to the second memory 120.

When the plurality of artificial intelligence models are loaded in the second memory 120, the processor 130 may identify the number of times of use of the plurality of artificial intelligence models loaded in the second memory 120, and load a compression artificial intelligence model with respect to at least one of the plurality of artificial intelligence models based on the identified number. That is, the processor 130 may increase the compression rate of the artificial intelligence model of which use number is below a predetermined number, and reduce the compression rate of the artificial intelligence model of which use number is more than the predetermined number among the plurality of artificial intelligence models loaded in the second memory 120.

When the first compression artificial intelligence model is loaded in the second memory 120, the processor 130 may store the loaded first compression artificial intelligence model in the first memory 110. The processor 130 may store the loaded compression artificial intelligence model in the first memory. The processor 130 may store the load compression artificial intelligence model in the first memory to generate a compression artificial intelligence model later, or receive the compression artificial intelligence model from the first memory instead of an external source.

When the electronic apparatus 100 includes the display 150, the processor 130 may control the display 150 to display a user interface (UI) for receiving the performance of at least one artificial intelligence model of the plurality of artificial intelligence models stored in the first memory 110. The first compression artificial intelligence model may be an artificial intelligence model compressed based on the conditions input through the UI for receiving the performance of the first artificial intelligence model.

The first artificial intelligence model may be compressed using at least one of Pruning, Quantization, Decomposition, and Knowledge Distillation. Pruning may be a compression method for deleting a meaningless weight parameter or a weight parameter that does not affect an output value significantly among weight parameters of the artificial intelligence model. Quantization is one of the compression techniques that quantizes each weight parameter to a predetermined bit. Decomposition may be a compression method for reducing the size of the weight parameter by performing approximated decomposition of a weight matrix, which is a collection of weight parameters, or a tensor. Knowledge Distillation may be a compression method for generating and training a Student model smaller than an original model by setting the original model as a Teacher model. The Student model may be generated through the above-described Pruning, Decomposition, or Quantization.

Figure 3:
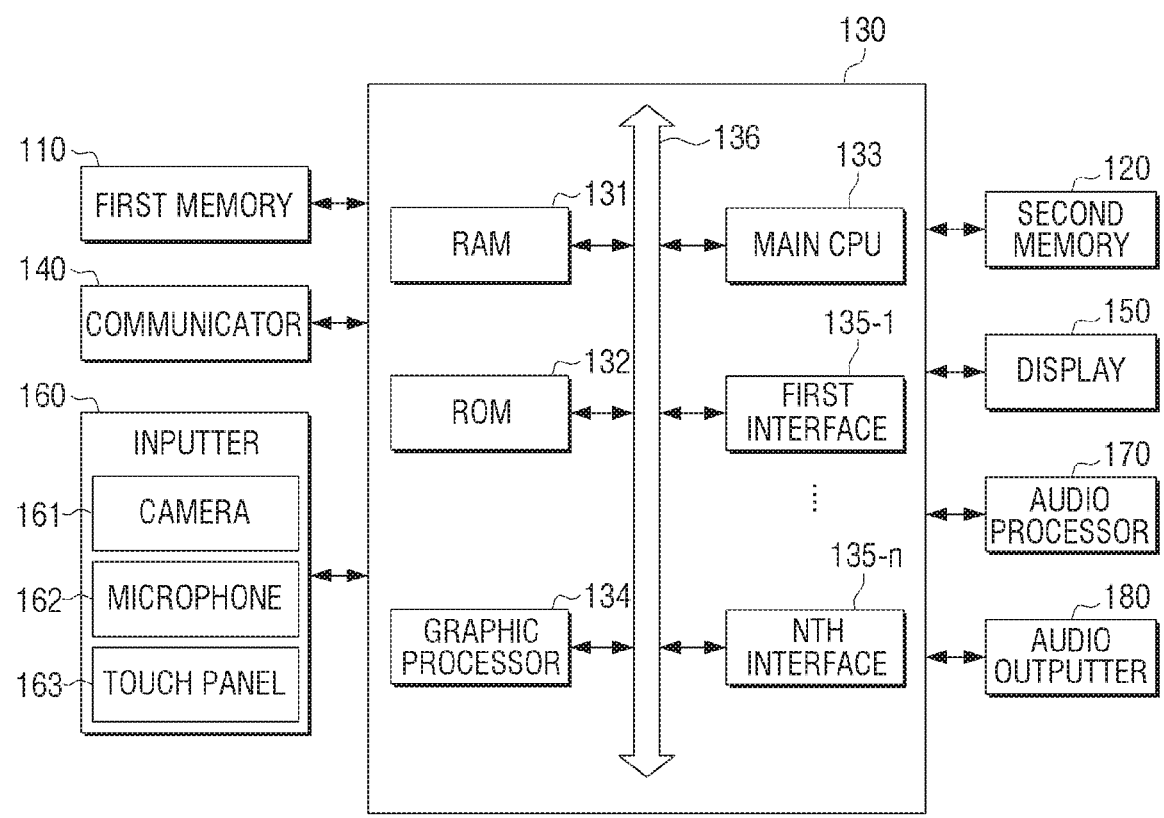
FIG. 3 is a detailed block diagram to illustrate a configuration of an electronic apparatus, according to an embodiment.

FIG. 3 is a detailed block diagram to illustrate a configuration of an electronic apparatus according to an embodiment.

An electronic apparatus 100 may further include a first memory 110, a second memory 120, a processor 130, a communicator 140, a display 150, au inputter 160, an audio processor 170 and an audio outputter 180. However, the disclosure is not limited to the above-described constituent elements, but to the extent necessary, some constituent elements may be further added or omitted.

The first memory 110 and the second memory 120 may store or load an artificial intelligence model. The first memory 110 may be configured by an auxiliary memory device, or a second memory device, and the second memory 120 may be configured by a main memory device or a first memory device. The second memory 120 may consist of the RAM 131 or the ROM 132 in the processor 130.

The communicator 140 may be configured to perform communication with an external device. For example, the electronic apparatus 100 may receive a plurality of artificial intelligence models from an external server through the communicator 140 and store the plurality of artificial intelligence models in the first memory 110. The electronic apparatus 100 may receive a plurality of compression artificial intelligence models for respective artificial intelligence models through the communicator 140.

The communicator 140 may communicate with an external device through a third device (e.g., a relay device, a hub, an access point, a server, or a gateway). The wireless communication may include, for example, LTE, LTE Advance (LTE-A), code division multiple access (CDMA), wideband CDMA (WCDMA), universal mobile telecommunications system (UMTS), wireless broadband (WiBro), or Global System for Mobile Communications (GMS). According to one embodiment, the wireless communication may include, for example, wireless fidelity (WiFi), Bluetooth, Bluetooth low power (BLE), Zigbee, Near Field Communication, Magnetic Secure Transmission, Frequency (RF), or body area network (BAN). The wired communication may include, for example, at least one of a universal serial bus (USB), a high definition multimedia interface (HDMI), a recommended standard 232 (RS-232), a power line communication or a plain old telephone service (POTS). The network over which the wireless or wired communication is performed may include at least one of a telecommunications network, e.g., a computer network (e.g., a LAN or WAN), the Internet, or a telephone network.

The display 150 may be configured to output various images. To be specific, if a plurality of compression artificial intelligence models obtained by compressing the first artificial intelligence model using a plurality of methods fails to satisfy a predetermined condition, the display 150 may display a message notifying that the predetermined condition is not satisfied.

The display 150 may display a UI for receiving the performance of at least one artificial intelligence model among a plurality of artificial intelligence models stored in the first memory 110.

The display 150 for providing various images may be implemented with various types of display panels. For example, the display panel may be a liquid crystal display (LCD), an organic light emitting diode (OLED), an active matrix organic light-emitting diode (AM-OLED), a liquid crystal on silicon (LCOS), or Digital Light Processing (DLP). The display 150 may also be coupled to at least one of a front area and a side area and a back area f the electronic device 100 in the form of a flexible display.

The inputter 160 may be configured to receiving user commands. The inputter 160 may include a camera 161, a microphone 162, and a touch panel 163.

The camera 161 may be configured to obtain image data near the electronic apparatus 100. The camera 161 may capture a still image or a video. For example, the camera 161 may include at least one image sensor (e.g., a front sensor or a back sensor), lens, image signal processor (ISP), or flash (e.g., LED, xenon lamp, or the like). The microphone 162 may be configured to obtain noise near the electronic apparatus 100. The microphone 162 may receive external source signals and generate electrical voice information. The microphone 162 may use various noise deleting algorithms for deleting noises generated at the time of receiving external sound signals. Image information or voice information input through the camera 161 and the microphone 162 may be input as an input value of an artificial intelligence model.

The touch panel 163 may be configured to receive various use inputs. The touch panel 163 may receive data by user operation. The touch panel 163 may be combined with a display to be described below.

The inputter 160 may be variously configured to receive various data other than the camera 161, the microphone 162, and the touch panel 163.

The audio processor 170 may be configured to process audio data. The audio processor 170 may various processing such as decoding, amplification, and noise filtering of audio data. The audio data processed by the audio processor 150 may be output to the audio outputter 180.

The audio outputter 180 may be configured to output various alarming voices and voice messages other than various audio data after various processing such as decoding, amplification, and noise filtering by the audio processor 170. The audio outputter 180 may be implemented as a speaker, but is not limited thereto. The audio outputter 180 may be implemented as an output terminal that outputs audio data.

The processor 130 may control the overall operation of the electronic apparatus 100. The processor 130 may include a RAM 131, a ROM 132, a CPU 133, a Graphic Processing Unit (GPU) 134, first to nth interfaces 135-1 to 135-n, and a bus 136. The RAM 131, the ROM 132, the CPU 133, the Graphic Processing Unit (GPU) 134, the first to nth interfaces 135-1 to 135-n, and the like may be connected to one another via the bus 136.

A set of instructions, etc., for system booting may be stored in the ROM 132. When a turn-on command is input and power is supplied, the CPU 133 may copy the O/S stored in the memory to the RAM 131 according to the one or more instructions stored in the ROM 132, execute the O/S and perform system booting. When the system booting is completed, the CPU 133 may copy the various programs stored in the memory to the RAM 131, execute the program copied to the RAM 131 and perform various operations.

The CPU 133 may access the first memory 110 or the second memory 120, and perform booting by using an operating system (O/S) stored in the first memory 110 or the second memory 120. The CPU 133 may perform various operations by using various programs, contents, data, etc., stored in the first memory 110 or the second memory 120.

The first to nth interfaces 135-1 to 135-n may be connected to various constituent elements. One of the interfaces may be a network interface connected to an external device through a network.

Hereinafter, one or more example embodiments will be described with reference to FIG. 4A to FIG. 10.

FIGS. 4A, 4B, 4C, and 4D are example views to illustrate a method for loading an artificial intelligence model according to an embodiment.

Figure 4A:
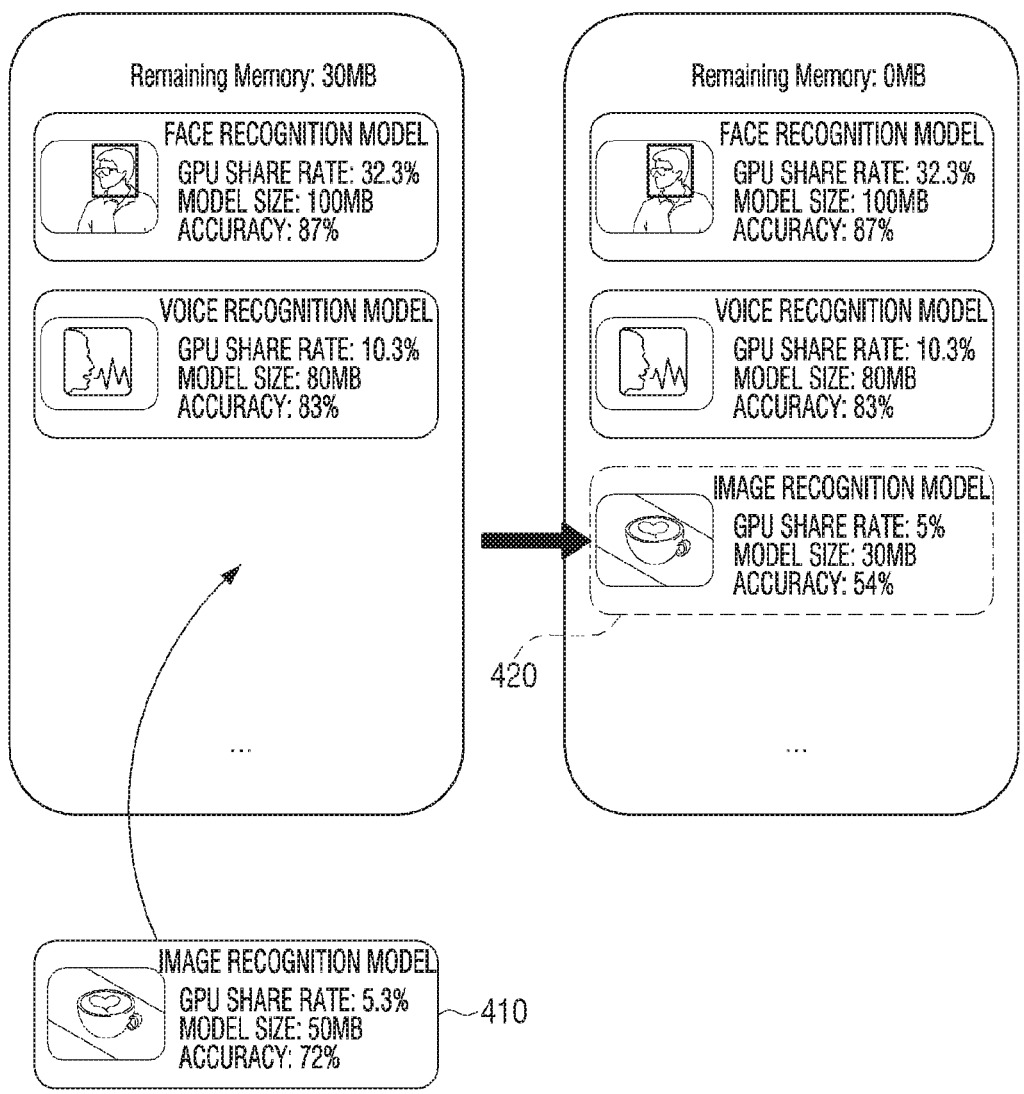
FIGS. 4A, 4B, 4C, and 4D are example views to illustrate a method for loading an artificial intelligence model, according to an embodiment.

Referring to FIG. 4A, the available memory size of the second memory 120 may be 30 MB. If a control signal for loading an image recognition model 410 is received, the electronic apparatus 100 may identify the size of the available memory of the second memory 120. The size of the image recognition model 410 may be 50 MB, and the size of the available memory of the second memory 120 may be 30 MB. Therefore, the electronic apparatus 100 may compress the image recognition model 410 and load the image recognition model to the second memory 120. Referring to the right side of FIG. 4A, the size of the compressed image recognition model 420 may be 30 MB. In this case, the accuracy of the compressed image recognition model 420 may be reduced, but the image recognition model may be loaded according to the size of the available memory of the second memory 120.

Figure 4B:

Referring to FIG. 4B, the electronic apparatus 100 may output a message notifying that the image recognition performance is degraded because the memory size is small.

Figure 4C:
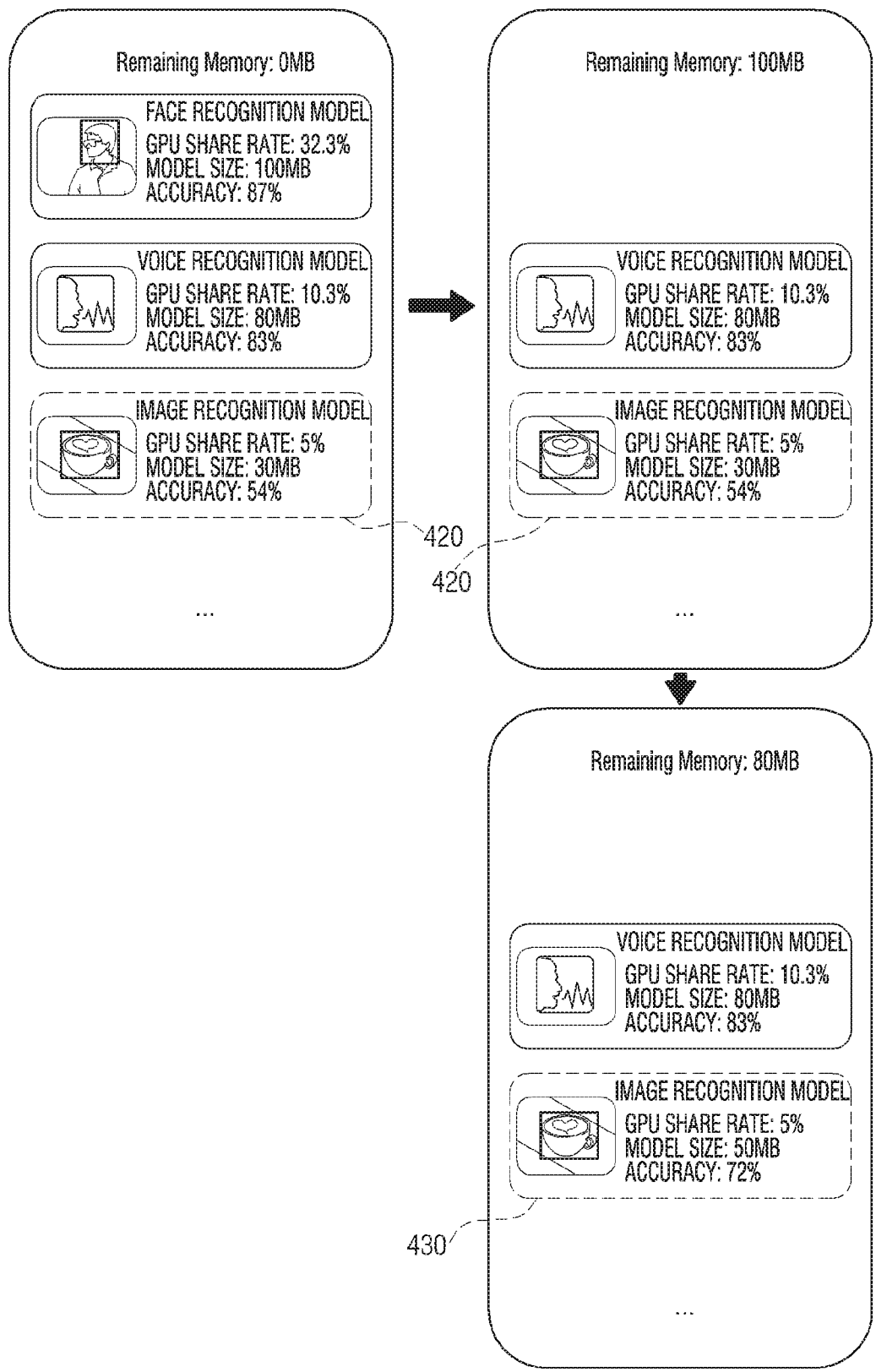

When the size of the available memory of the second memory 120 is changed, the electronic apparatus 100 may compress an image recognition model again. For example, referring to FIG. 4C, when a face recognition model, a voice recognition model, and a compressed image recognition model 420 are loaded in the second memory 120, and the face recognition model is deleted, the size of the available memory of the second memory 120 may be increased to 100 MB. Therefore, the electronic apparatus 100 may load the newly compressed image recognition model 430 to the second memory 120, instead of the compressed image recognition model with degraded performance 420. FIG. 4C illustrates that the compressed image recognition model 430 has the same performance as the image recognition model 410 of FIG. 4A, but is not limited thereto. For example, to the extent necessary, the electronic apparatus 100 may load the image recognition model having a share rate of 7%, a model size of 100 MB, and the accuracy rate of 85% to the second memory 120. In this case, the performing of the compression to the extent necessary may relate to a predetermined condition for the performance of the artificial intelligence model as described below.

Figure 4D:
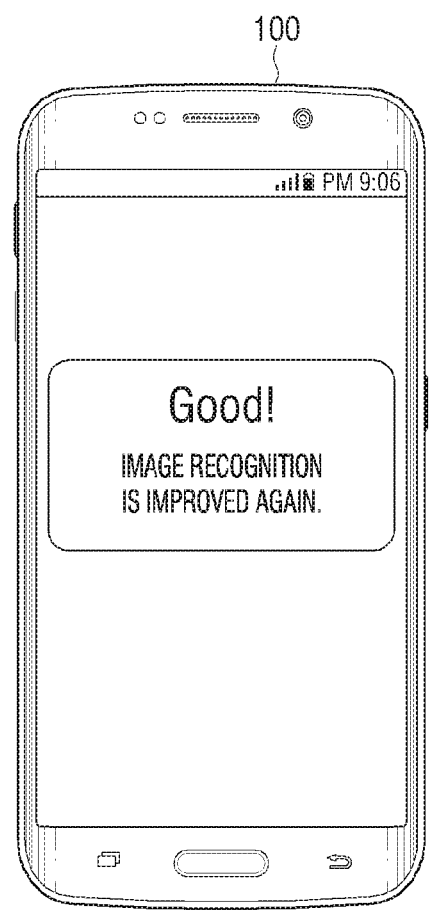

Referring to FIG. 4C, the electronic apparatus 100 may output a message for notifying that an image recognition performance is improved again as shown in FIG. 4D.

FIGS. 5A, 5B, 5C, and 5D are example views to illustrate a method for setting conditions for the performances of a plurality of artificial intelligence models according to an embodiment.

Figure 5A:
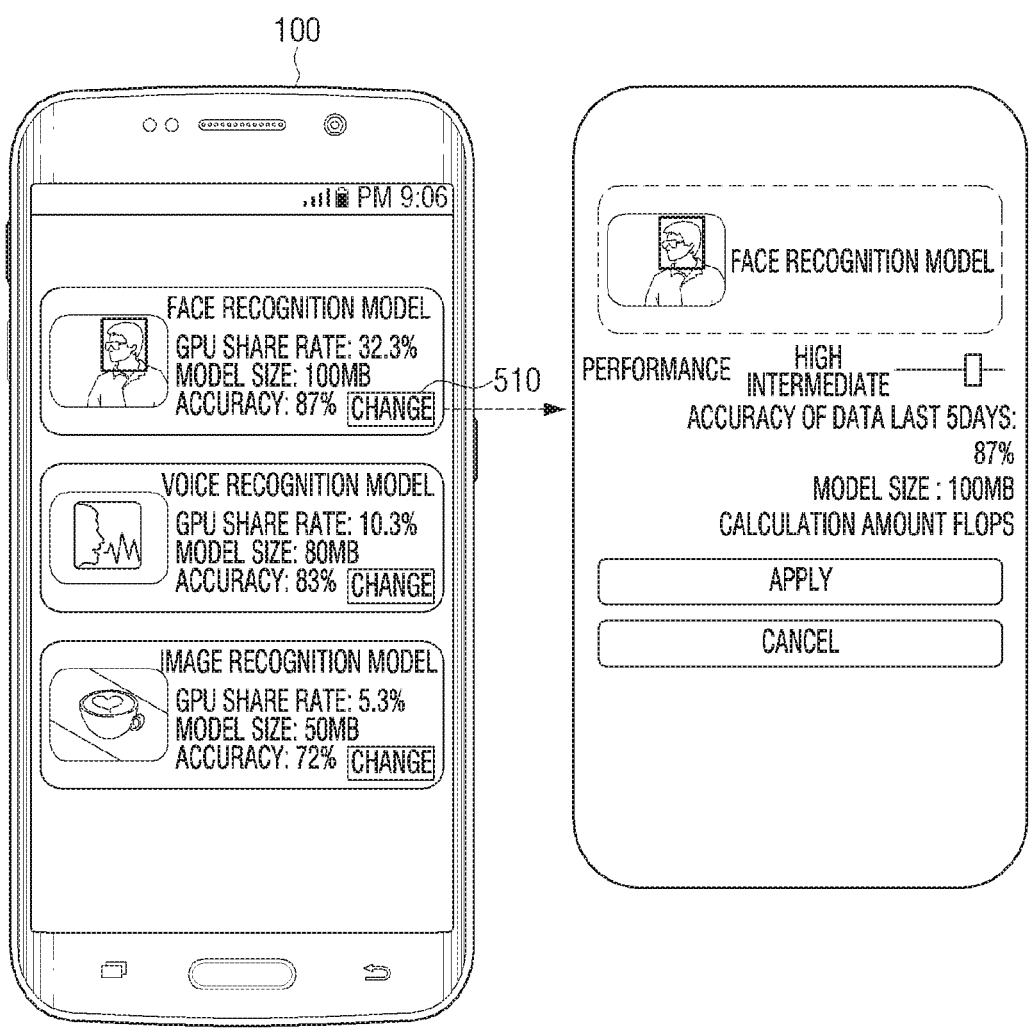
FIGS. 5A, 5B, 5C, and 5D are example views to illustrate a method for setting conditions for the performances of a plurality of artificial intelligence models, according to an embodiment.

Referring to the left side of FIG. 5A, the electronic apparatus 100 may display a UI screen for changing the performances and the performance conditions of the plurality of artificial intelligence models stored in the first memory 110. The face recognition model may have the performance in which the share rate is 32.3%, the model size is 100 MB, and the accuracy rate is 87%. The voice recognition model may have the performance in which the share rate of the processor 130 is 10.3%, the model size is 80 MB, and the accuracy rate is 83%. The image recognition model may have the performance in which the share rate of the processor 130 is 5.3%, the model size is 50 MB, and the accuracy rate is 72%.

If a user command is received through a change element 510 for changing the performance condition of the face recognition model, the electronic apparatus 100 may display a UI screen for changing the performance condition of the face recognition model as shown in the right side of FIG. 5A. The UI screen for changing the performance condition may include information on a UI bar for controlling the performance, the accuracy for recent face recognition, the size of the face recognition model, and the amount of calculation. The performance of the face recognition model may be improved by moving the UI bar to the right, and the performance of the face recognition model may be degraded by moving the UI bar to the left. The performance of the artificial intelligence model corresponding to the position of the UI bar may be a predetermined performance condition. The share rate of the processor 130, the size and the accuracy of the artificial intelligence model may be pre-stored according to the position of each UI bar. Therefore, a user may simply control the performance of the artificial intelligence model by controlling the UI bar.

Figure 5B:
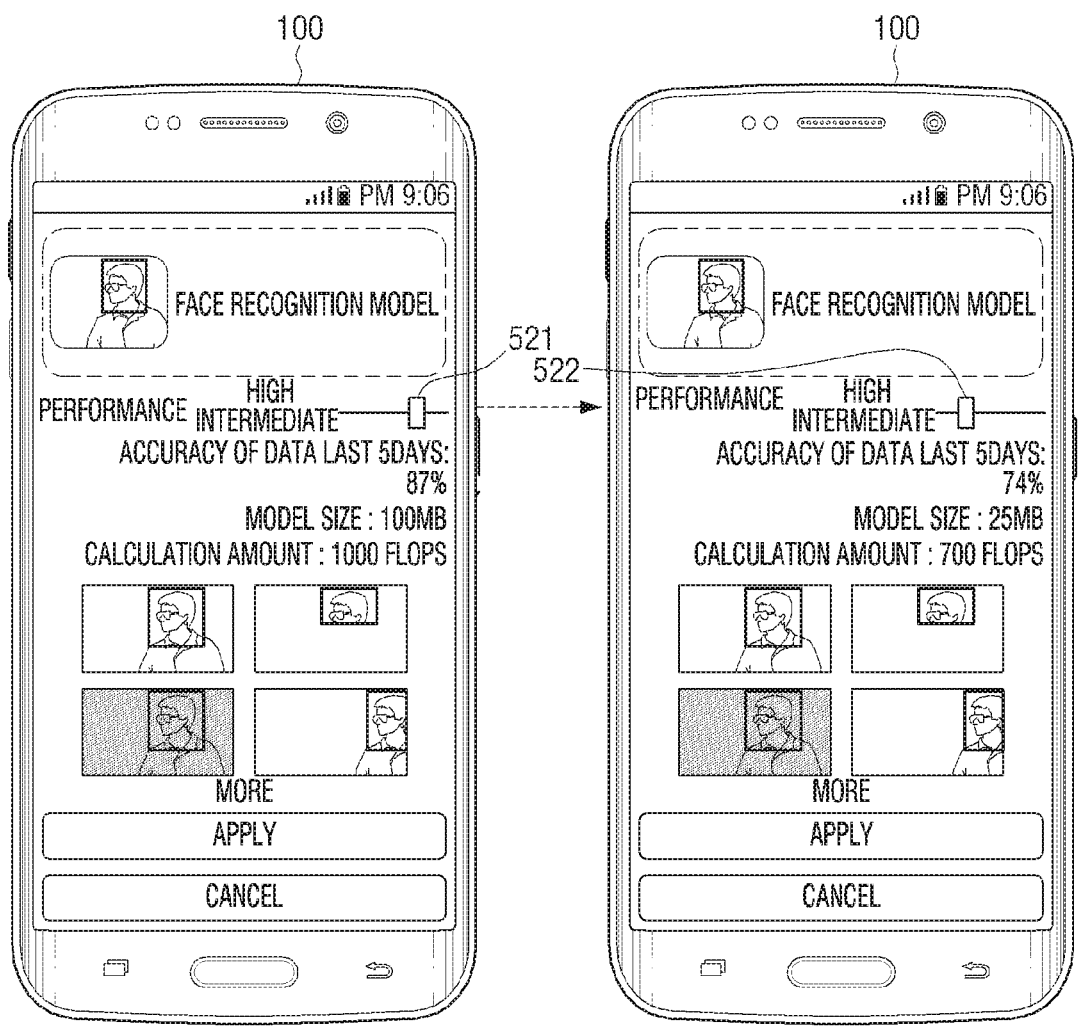

Referring to FIG. 5B, a UI screen for changing the performance condition may further display the result of recent face recognition. Referring to FIG. 5B, the electronic apparatus 100 may display a face recognition result of a specific image, and guide a user to control the performance of the user recognition model as shown in UI elements 521 and 522.

The electronic apparatus 100 may display a screen for recommending a compression artificial intelligence model according to the current state of the second memory 120 instead of a UI bar for controlling the performance of the face recognition model. Referring to the left side of FIG. 5C, the electronic apparatus 100 may display a UI screen for recommending the artificial intelligence model compressed based on the available memory size of the second memory 120. If a UI element 530 for selecting one of the recommend plurality of artificial intelligence models is selected, the electronic apparatus 100 may display a UI screen as shown in the right side of FIG. 5D.

Figure 5C:
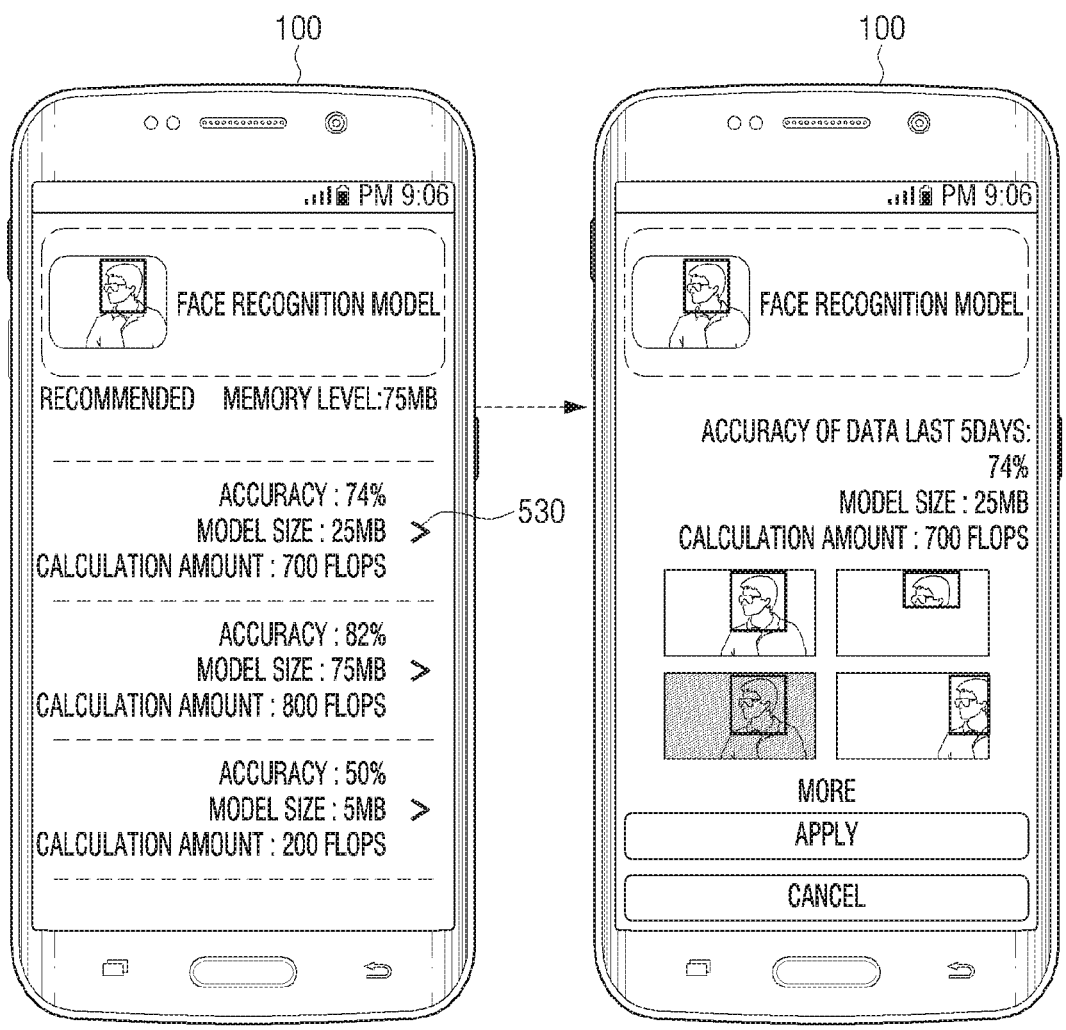

Referring to FIG. 5A to FIG. 5C, the electronic apparatus 100 may recommend the artificial intelligence model compressed based on the state of the second memory 120, or the share state of the processor 130 of the artificial intelligence model, and the size and the accuracy of the artificial intelligence model may be stored to identify the performance condition of the artificial intelligence model.

Therefore, the electronic apparatus 100 may display a UI screen for controlling each performance condition (the share rate of the processor 130 of the artificial intelligence model, the size and the accuracy of the artificial intelligence model).

Figure 5D:
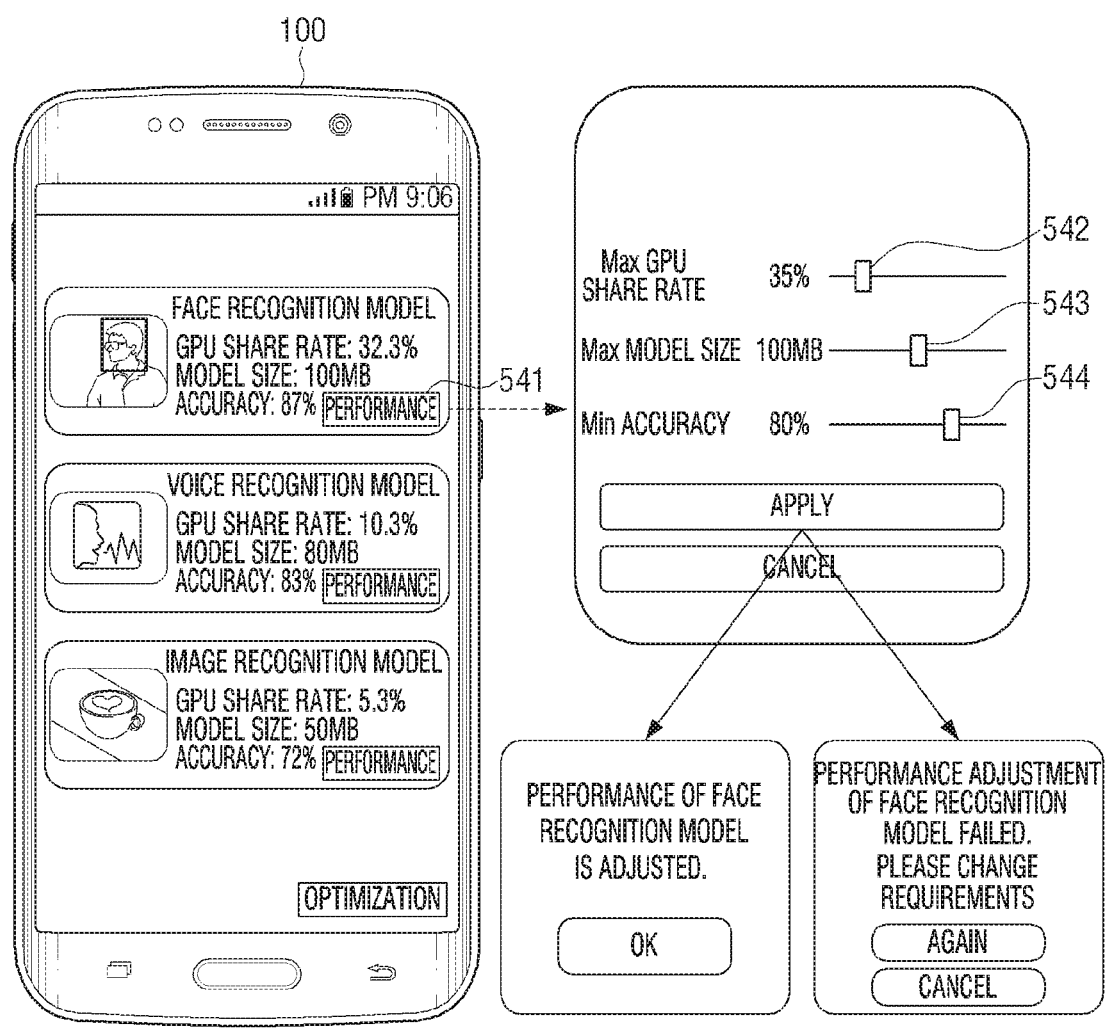

Referring to the left side of FIG. 5D, if a user command for selecting a UI element 541 for controlling the performance of the face recognition model among a plurality of artificial intelligence models loaded in the second memory 120 is input, the electronic apparatus 100 may display a UI for controlling each performance condition as shown in the right side of FIG. 5D. The performance condition of the artificial intelligence model may be the maximum share rate of the processor 130 of the compressed artificial intelligence model, the maximum size of the compressed artificial intelligence model, and the minimum accuracy condition of the compressed artificial intelligence model. If a user command is input through the UI bar 542 for controlling the maximum share rate of the processor 130 of the compressed artificial intelligence model, a UI bar for controlling the maximum size of the compressed artificial intelligence model 543, and a UI bar for controlling the minimum accuracy of the compressed artificial intelligence model 544, the electronic apparatus 100 may compress an artificial intelligence model according to the input condition.

For example, when the maximum share rate of the processor 130 of the compressed artificial intelligence model is 35%, the maximum size of the compressed artificial intelligence model is 100 MB, and the minimum accuracy of the compressed artificial intelligence model is 80%, the artificial intelligence model compressed by the electronic apparatus may be 35% or less, the model size may be 100 MB or less, and the accuracy may be 80% or more.

If there is a compressed artificial intelligence model that satisfies the input condition, the electronic apparatus 100 may display a message notifying that the artificial intelligence model is compressed according to a predetermined condition. If there is no compressed artificial intelligence model that satisfies the input condition, the electronic apparatus 100 may display a message notifying that the compression of the artificial intelligence model failed. For example, referring to FIG. 5D, if there is a compressed artificial intelligence model that satisfies the input condition, the electronic apparatus may output a message that 'the performance of the face recognition model is adjusted', and if there is no compressed artificial intelligence model that satisfies the input condition, the electronic apparatus may output a message that 'the performance adjustment of the face recognition model failed, please change requirements'.

FIGS. 5A, 5B, 5C, and 5D illustrate the method for controlling the performance of the artificial intelligence model loaded in the second memory 120, but is not limited thereto. The electronic apparatus 100 may control the performance of each artificial intelligence model stored in the first memory 110.

Figure 6:
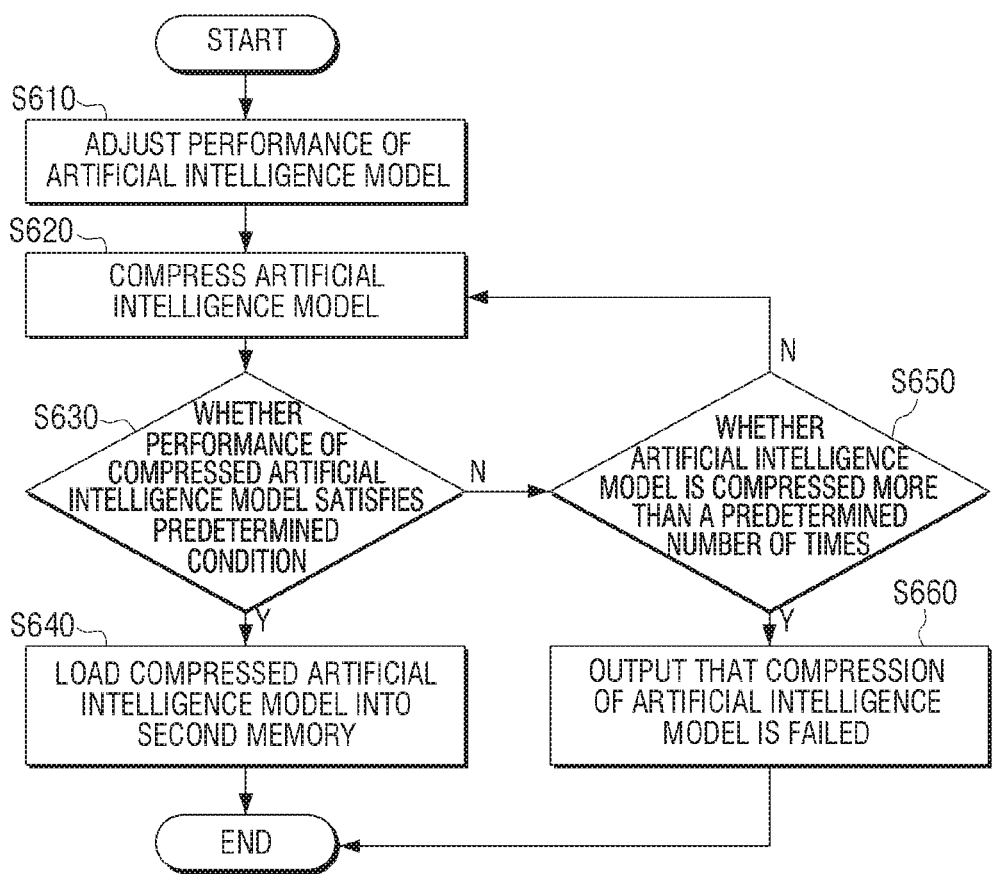
FIG. 6 is an example view to illustrate a process of compressing an artificial intelligence model, according to an embodiment.

FIG. 6 is an example view to illustrate a process of compressing an artificial intelligence model according to an embodiment.

Referring to FIGS. 5A, 5B, 5C, and 5D, the electronic apparatus 100 may control the performances of a plurality of artificial intelligence models at step S610. For example, the electronic apparatus 100 may set the condition for the maximum share rate of the processor 130 of the compressed artificial intelligence model, the maximum size of the compressed artificial intelligence model, and the minimum accuracy of the compressed artificial intelligence model for each artificial intelligence model.

When receiving a control signal for compressing at least one of a plurality of artificial intelligence models, the electronic apparatus 100 may compress at least one artificial intelligence model at step S620. The above-described artificial intelligence model may be compressed by at least one of Pruning, Quantization, Decomposition, and Knowledge Distillation. The artificial intelligence mode may be compressed by the electronic apparatus 100, but could be compressed by an external server so that the electronic apparatus 100 receives the compressed artificial intelligence model.

The electronic apparatus 100 may identify whether the compressed artificial intelligence model satisfies a predetermined condition at step S630. If the compressed artificial intelligence model satisfies the predetermined condition at step S630-Y, the electronic apparatus 100 may load the compressed artificial intelligence model to the second memory. If the compressed artificial intelligence model fails to satisfy the predetermined condition at step S630-N, the electronic apparatus 100 may identify whether an artificial intelligence model is compressed more than a predetermined number of times at step S650.

If the artificial intelligence model is not compressed more than a predetermined number of times at step S650-N, the electronic apparatus 100 may return to the step S620, and compress artificial intelligence model again. The electronic apparatus 100 may compress an artificial intelligence model using a different method from a previous compression method.

If the artificial intelligence model is compressed more than a predetermined number of times at step S650-Y, the electronic apparatus 100 may output notifying that the compression of the artificial intelligence model fails at step S660. In other words, if the predetermined condition is not satisfied although the artificial intelligence model is compressed more than a predetermined number of times, the electronic apparatus 100 may identify that it is not possible to compress the artificial intelligence model to satisfy the predetermined condition, and output that compression of the artificial intelligence model fails. The electronic apparatus 100 may further output a message requesting to change a predetermined condition.

Figure 7:
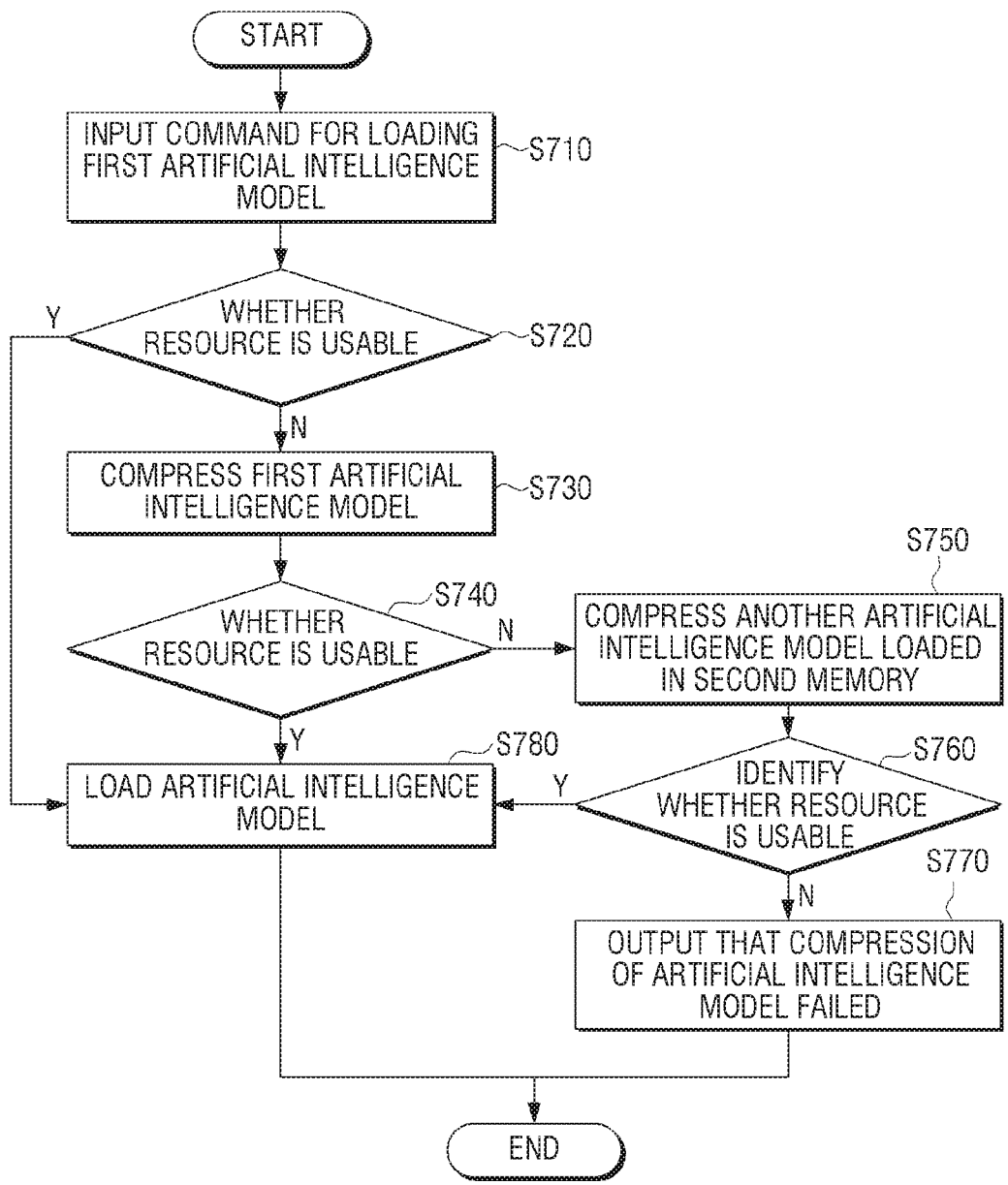
FIG. 7 is a flowchart to illustrate a compression method, according to an embodiment.

FIG. 7 is a flowchart to illustrate a compression method according to an embodiment.

Referring to FIG. 7, according to an embodiment, another artificial intelligence model (e.g., a first artificial intelligence model) is loaded in a state in which at least one artificial intelligence model is loaded in the second memory 120.

The electronic apparatus 100 may receive a command for loading the first artificial intelligence model at step S710. The electronic apparatus 100 may identify whether a resource can be used at step S720. Identifying whether the resource can be used may be defined by identifying whether the first artificial intelligence model satisfies the performance condition such as the available memory size of the second memory 120, the share rate (CPU or GPU share rate) of the available processor 130, etc.

If it is identified that the resource is available at step S720-Y, the electronic apparatus 100 may load the first artificial intelligence model to the second memory 120 at step S780. If it is identified that the resource is not available at step S720-N, the electronic apparatus 100 may compress the first artificial intelligence model at step S730. The electronic apparatus 100 may identify whether the resource is available with respect to the compressed first artificial intelligence model at step S740.

If it is identified that the resource is available at step S740-Y, the electronic apparatus 100 may load the compressed first artificial intelligence model to the second memory 120 at step S780. If it is identified that the resource is not available at step S740-N, the electronic apparatus 100 may compress another artificial intelligence model loaded in the second memory 120. Referring to FIG. 6, if the resource is not available, the electronic apparatus 100 may compress the first artificial intelligence model in a different method. However, referring to FIG. 7, the electronic apparatus 100 may compress another artificial intelligence model loaded in the second memory 120, except for the first artificial intelligence model, instead of compressing the first artificial intelligence model in a different method for loading the artificial intelligence model to the second memory 120.

If another artificial intelligence model is compressed, the electronic apparatus 100 may identify whether a resource is available at step S760. The electronic apparatus 100 may identify whether a resource increased by another compressed artificial intelligence model is appropriate to load the first artificial intelligence model compressed at step S730.

When it is identified that the resource is available at step S760-Y, the electronic apparatus 100 may load the another artificial intelligence model to the second memory 120 at step S780. If it is identified that the resource is not available, the electronic apparatus 100 may output that the compression of the artificial intelligence model fails at step S770.

The example described in FIG. 6 and FIG. 7 may be performed independently of each other, but is not limited thereto. For example, the identification of the resource at step S740 of FIG. 7 may be performed after the step S650 of FIG. 6 is performed. If it is determined that the resource is not available for the first artificial intelligence model compressed according to the step S730 at step S740-N, the electronic apparatus 100 may compress the first artificial intelligence model in a different method until the predetermined number of times as in step S650. That is, if it is determined that the resource is still not available even if the first artificial intelligence model is compressed more than predetermined number of times, the electronic apparatus 100 may compress another artificial intelligence model loaded in the second memory 120 according to the step S750.

Figure 8:
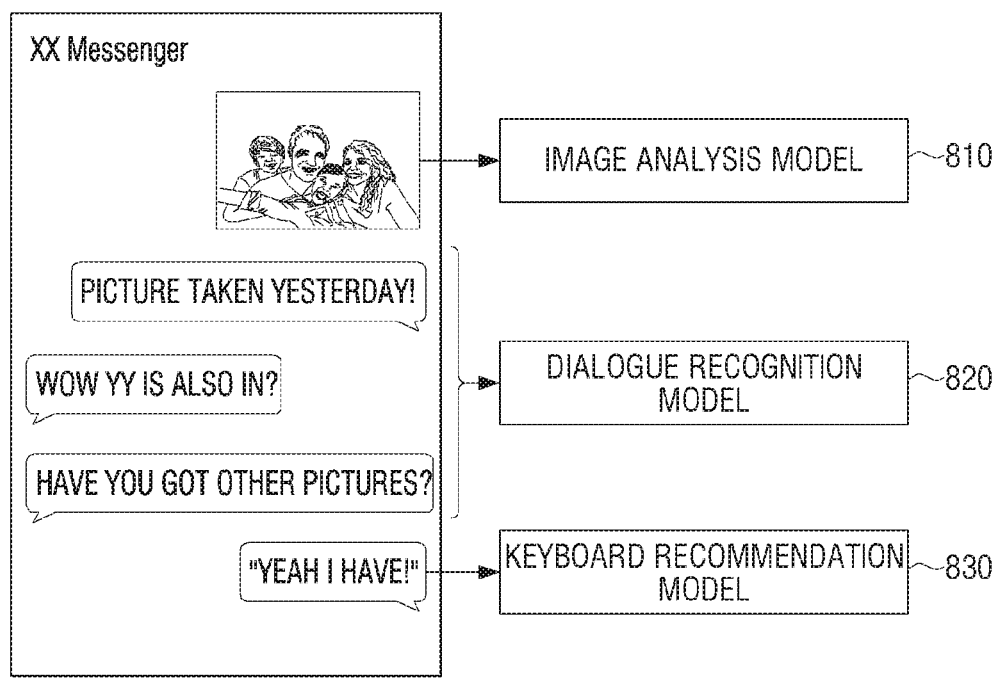
FIG. 8 is an example view to illustrate a method for using an artificial intelligence model according to one or more embodiments.

FIG. 8 is an example view to illustrate a method for using an artificial intelligence model according to one or more embodiments.

Referring to FIG. 8, the electronic apparatus 100 may exchange pictures and conversations with the other by executing a messenger application. The image analysis model 810, the dialogue recognition model 820, and the keyboard recommendation model 830 may be loaded to the second memory 120 of the electronic apparatus 100. The dialogue recognition model may be a model for analyzing dialogue contents continuously if a dialogue is input through a messenger application for understanding the dialogue contents with the other. The dialogue recognition model may manage Language Understanding (NLU) and contexts. The image analysis model may be a model for analyzing the image received through the messenger application. The image analysis model may analyze the object included in the image or classify the analyzed object. The keyboard recommendation model may be a model for recommending words or sentences based on the dialogue situation identified through the dialogue recognition model. The keyboard recommendation model may predict and recommend Natural Language Understanding (NLU) and user's key input.

For example, the electronic apparatus 100 may analyze dialogues and recommend the action to be performed by a user. The electronic apparatus 100 may input the dialogue such as "the photo taken yesterday!", "wow, did YY also go there?, and "have you got any other pictures?" into a dialogue recognition model as input values, and recommend an action such as "sending the photo taken with YY yesterday to the other". In this case, the electronic apparatus 100 may relatively increase the performance of the dialogue management model by compressing the image analysis model and the keyboard recommendation model to a low performance.

The electronic apparatus 100 may analyze images and dialogues and perform an action performed to be a user. The electronic apparatus 100 may input dialogue such as "the photo taken yesterday!", "wow, did YY also go there?, and "have you got any other picture?" into the dialogue recognition model as input values and recommend the action such as "sending the photo taken with YY yesterday to the other". The electronic apparatus 100 may identify YY included in the image through image analysis, and additionally obtain the image including YY of the photos taken yesterday to provide. The electronic apparatus 100 may compress the keyboard recommendation model to the low performance, and relatively increase the performances of the dialogue management model and the image analysis model.

The electronic apparatus 100 may recommend words or sentences to a user by analyzing images and dialogues. The electronic apparatus 100 may input dialogue such as "the photo taken yesterday!", "wow, did YY also go there?, and "have you got any other picture?" into the dialogue recognition model as input values and recommend the action such as "sending the photo taken with YY yesterday to the other". The electronic apparatus 100 may identify YY included in the image through image analysis, and additionally obtain the image including YY of the photos taken yesterday to provide. When there is a photo taken with YY yesterday, the electronic apparatus 100 may recommend the word "Yeah, I have!'. In this case, the image analysis model, the dialogue management model, and the keyboard recommendation model may be compressed to have the performance of a certain level.

Referring to an example embodiment of FIG. 8, the performance of each model may be set by a user referring to FIG. 5A to FIG. 5D. For example, if the user does not use the keyboard recommendation model, the electronic apparatus 100 may compress each artificial intelligence model according to user settings. The electronic apparatus 100 may not load the keyboard recommendation model to the second memory 120, and only load the dialogue recognition model and the image analysis model.

Even if the user does not set the performance of the artificial intelligence model, the electronic apparatus 100 may identify the performance of the artificial intelligence model based on the specific situation, history, contexts, etc. For example, the electronic apparatus 100 may identify the performance and compression rate of the artificial intelligence model based on the number of times of use of each artificial intelligence model. For example, when the user does not use a result value output by a keyboard recommendation model, the electronic apparatus 100 may identify the performance of the keyboard recommendation model to be low (e.g., from the accuracy of 50% to the minimum memory capacity).

The electronic apparatus 100 may be a display device. When the electronic apparatus 100 uses a super resolution technology or a screen analysis technology for product order service, the artificial intelligence model may be necessary. Generally, the size of the second memory 120 of the display device may not be large, and therefore there may be a need for controlling the performance of the artificial intelligence model according to the situation. For example, when using the screen analysis model for the product order service, the electronic apparatus 100 may use a screen analysis model only in a specific situation (e.g., when a TV program is reproduced in the afternoon). If the user does not use the product order service, the electronic apparatus 100 may compress the product order service model to have a lower performance and load the product order service model to the second memory 120.

The electronic apparatus 100 may be an artificial intelligence speaker or an artificial intelligence robot. The electronic apparatus 100 may need limited words or object recognition used only in a particular place (e.g., a house). Therefore, the electronic apparatus 100 may limit the class of recognition words or the model related to the object recognition class to control the performance.

Figure 9A:
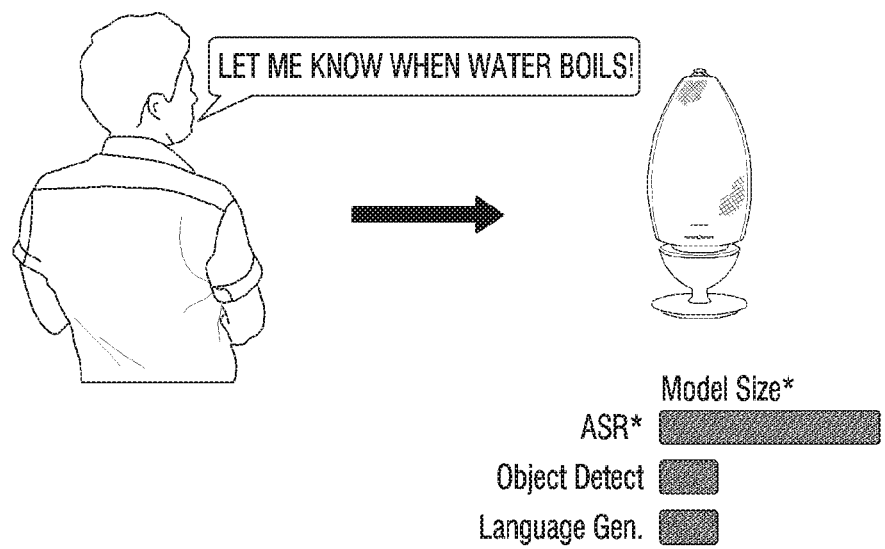
FIGS. 9A, 9B, and 9C are example views to illustrate a method for using an artificial intelligence model, according to an embodiment.
Figure 9B:
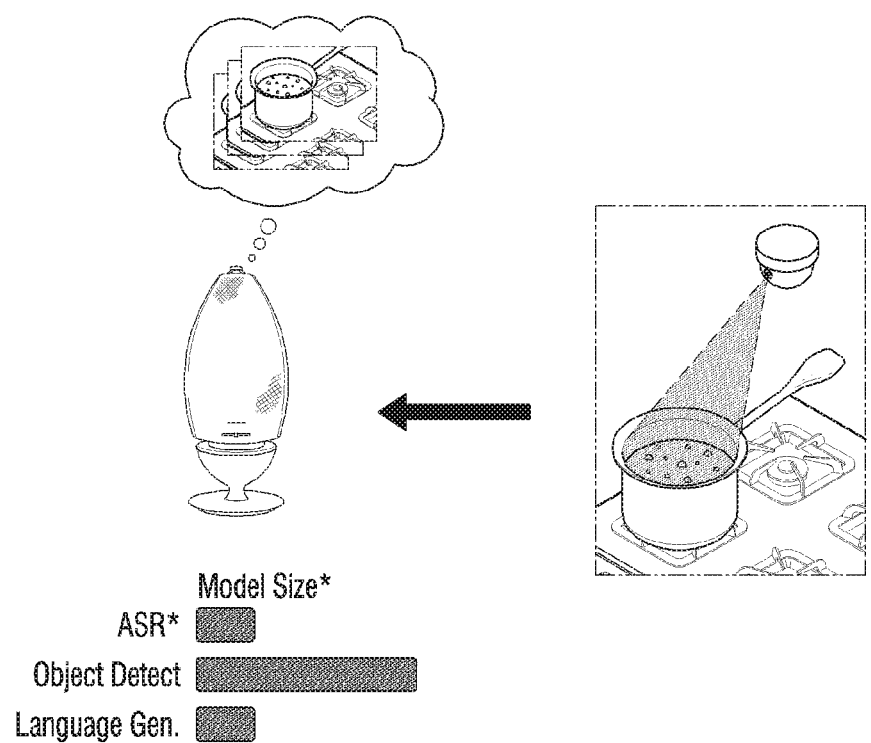
Figure 9C:
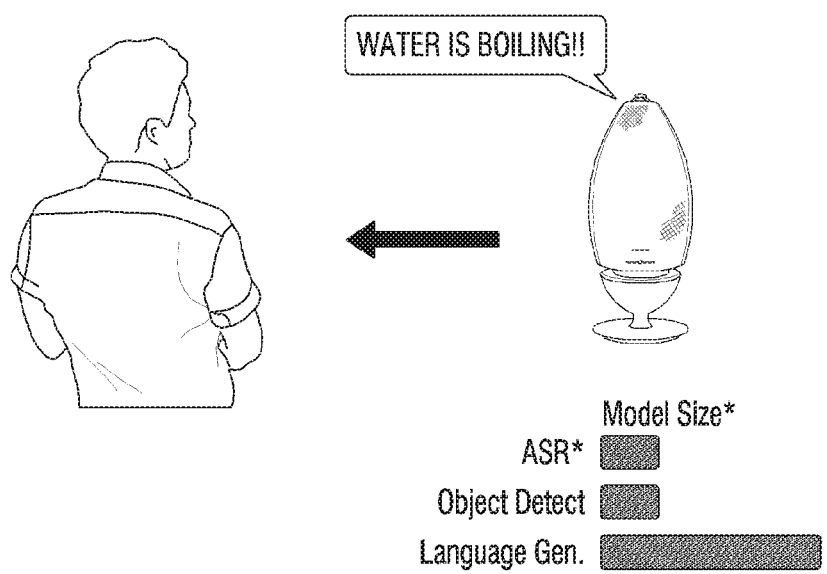

FIGS. 9A, 9B, and 9C are example views to illustrate a method for using an artificial intelligence model according to an embodiment.

As described above, the electronic apparatus 100 may not only compress the artificial intelligence model based on the performance condition set by a user, but also compress the artificial intelligence model based on specific statues, histories, context, etc. For example, when the plurality of artificial intelligence models used by the electronic apparatus 100 are used independently, or in a specific order, the electronic apparatus 100 may identify the compression order of the plurality of artificial intelligence models according to a specific order.

For example, an Internet of Things (IoT) system shown in FIG. 9A, FIG. 9B, and FIG. 9C could be considered. The IoT system shown in FIG. 9A, FIG. 9B, and FIG. 9C relates to an artificial intelligence system that identifies and notifies a specific situation in response to the command of a user to notify a specific situation. To be specific, according to the IoT system, if it receives a user's natural language command 'please let me know when water boils', and senses that the water boils through an IoT camera in the kitchen, this situation may be notified to a user. The user's natural language command 'please let me know when water boils' may be identified by an Automatic Speech Recognition model (ASR model), and sensing the pot water boiling may be identified by an object detect model. A response to the user may be generated by a Language Generation model.

For ease of convenience, the case will be assumed in which the second memory 120 is 128 MB, and each artificial intelligence model is as below. Embodiments are not limited to this.

TABLE 1

|  | #of weight parameters | Data representation bits | Model size (MB) |
| --- | --- | --- | --- |
| ASR | 20,000,000 | 32 bits | 80 |
| Object Detect | 100,000,000 | 32 bits | 400 |
| Language Generation | 30,000,000 | 32 bits | 120 |

'# of weight parameters' may indicate the number of weight parameters of the artificial intelligence parameter, and Data representation bits may indicate the number of bits necessary for storing one weight parameter. Model Size may be obtained by multiplying # of weight parameters by Data representation bits. To reduce the number of weight parameters, a Pruning method may be used, and a Quantization method may be used for reducing the bits necessary for storing one weight parameter.

Referring to FIG. 9A, the electronic apparatus 100 may receive a user command such as 'please let me know when water boils'. In this case, an Object Detect model and a Language Generation model may not be appropriate for analyzing a user command. Therefore, referring to FIG. 9A, the electronic apparatus 100 may maintain the size of an ASR model, and compress other artificial intelligence models. For example, the electronic apparatus 100 may compress each artificial intelligence model as below table 2 and load the artificial intelligence model to the second memory 120.

TABLE 2

|  | #of weight parameters | Data representation bits | Model size (MB) |
| --- | --- | --- | --- |
| ASR | 20,000,000 | 32 bits | 80 |
| Object Detect | 50,000,000 | 1 bits | 6.25 |
| Language Generation | 15,000,000 | 1 bits | 1.88 |

The second memory 120 may have the size of 128 MB, and the size of the ASR model may be 80 MB. Therefore, the electronic apparatus 100 may not compress the ASR model but load the ASR model to the second memory 120 as it is. The electronic apparatus 100 may compress the Object Detect model and the Language Generation model as in the table 2 and load them to the second memory 120.

When a user command is input, the electronic apparatus 100 may identify whether pot water boils according to the user command. Referring to FIG. 9B, the electronic apparatus 100 may receive an image of the pot from the camera included in the IoT system and analyze the received image. The electronic apparatus 100 itself may capture the pot and analyze the image.

In this case, the ASR model and the Language Generation model may not be appropriate for image analysis. Therefore, referring to FIG. 9B, the electronic apparatus 100 may compress other artificial intelligence models while maintaining the size of the Object Detect model. The model size of the Object Detect model may be 400 MB. Therefore, its size may be greater than the size of the second memory 120. Therefore, the electronic apparatus 100 may compress the Object Detect model as below in table 3 and load the model to the second memory 120.

TABLE 3

|  | #of weight parameters | Data representation bits | Model size (MB) |
| --- | --- | --- | --- |
| ASR | 10,000,000 | 1 bits | 1.25 |
| Object Detect | 100,000,000 | 8 bits | 100 |
| Language Generation | 15,000,000 | 1 bits | 1.88 |

The second memory 120 may have the size of 128 MB, and the model size of the Object Detect model may be 400 MB. Therefore, the electronic apparatus 100 may compress the Object Detect model based on the available memory size of the second memory 120 and load the model to the second memory 120, and compress the ASR model and the Language Generation model as table 3 to load the models to the second memory 120.

If it is sensed that pot water boils, the electronic apparatus 100 may output a message notifying that water boils to a user. Referring to FIG. 9C, the electronic apparatus 100 may output a voice such as 'pot water is boiling!'.

In this case, the ASR model and the Object Detect models are not appropriate for generating output voices. Therefore, referring to FIG. 9C, the electronic apparatus 100 may compress other artificial intelligence models while maintaining the size of the Language Generation model. For example, the electronic apparatus 100 may compress each artificial intelligence model as below table 4 and load the artificial intelligence model to the second memory 120.

TABLE 4

|  | #of weight parameters | Data representation bits | Model size (MB) |
| --- | --- | --- | --- |
| ASR | 10,000,000 | 1 bits | 1.25 |
| Object Detect | 50,000,000 | 1 bits | 6.25 |
| Language Generation | 30,000,000 | 32 bits | 120 |

The second memory 120 may have the size of 128 MB, and the Language Generation model may have the size of 120 MB, the electronic apparatus 100 may not compress the Language Generation model, but may load the model to the second memory 120 as it is. The electronic apparatus 100 may compress the ASR model and the Object Detect model as in Table 4 and load the models to the second memory 120.

According to an embodiment, the electronic apparatus 100 may directly compress a plurality of artificial intelligence models, or request compression of an artificial intelligence model to an external server. When the electronic apparatus 100 requests the compression of the artificial intelligence model to the external server, the electronic apparatus 100 may receive the compressed artificial intelligence model from the external server, and load the artificial intelligence model to the second memory 120. When the electronic apparatus 100 directly compresses the artificial intelligence model, different compression methods may be used depending on the situation. For example, when a quick compression is request, the electronic apparatus 100 may compress an artificial intelligence model using a compression method that does not request an additional training (e.g., pruning, etc.). If a quick compression is not needed, the electronic apparatus 100 may compress an artificial intelligence model using various methods in consideration of accuracy.

According to an embodiment, the electronic apparatus 100 may store various compression artificial intelligence models in the first memory 110, and load the necessary compression artificial intelligence model from the first memory 110 to the second memory 120. The form of the compression artificial intelligence model stored in the first memory 110 may vary.

For example, when compressing the artificial intelligence model according to a predetermined condition, the electronic apparatus 100 (or an external server) may store the compressed artificial intelligence model in the first memory 110. When the compression artificial intelligence model of the size similar to the compressed artificial intelligence model is pre-stored in the first memory 110, the electronic apparatus 100 may compare the performances of the pre-stored compression artificial intelligence model with newly compressed artificial intelligence model, and store the compression artificial intelligence model with a better performance in the first memory 110.

When downloading an initial artificial intelligence model from an external server, the electronic apparatus 100 may download various compression artificial intelligence models relating to the downloaded artificial intelligence model. For example, when the artificial intelligence model is 64 MB, the electronic apparatus 100 may obtain a compression artificial intelligence model of 32 MB that is half of the artificial intelligence model of 64 MB, a compression artificial intelligence model of 16 MB that is half of the compression artificial intelligence model of 32 MB, a compression artificial intelligence model of 8 MB that is half of the compression artificial intelligence model of 16 MB, a compression artificial intelligence model of 4 MB that is half of the artificial intelligence model of 8 MB, a compression artificial intelligence model of 2 MB that is half of the artificial intelligence model of 4 MB, and a compression artificial intelligence model of 1 MB that is half of the artificial intelligence model of 2 MB. The electronic apparatus 100 may store 6 (six) compression artificial intelligence models in the first memory 110 with respect to the artificial intelligence model of 64 MB. When compression artificial intelligence models having a half size are stored, a space in which one artificial intelligence model and compression artificial intelligence models are stored may be equal to or smaller than 2 times the size of the original artificial intelligence model. For example, the sum of the sizes of the artificial intelligence model of 64 MB, and 6 (six) compression artificial intelligence models may be 127 MB, and the electronic apparatus 100 may store various compression artificial intelligence models in a small capacity.

Figure 10:
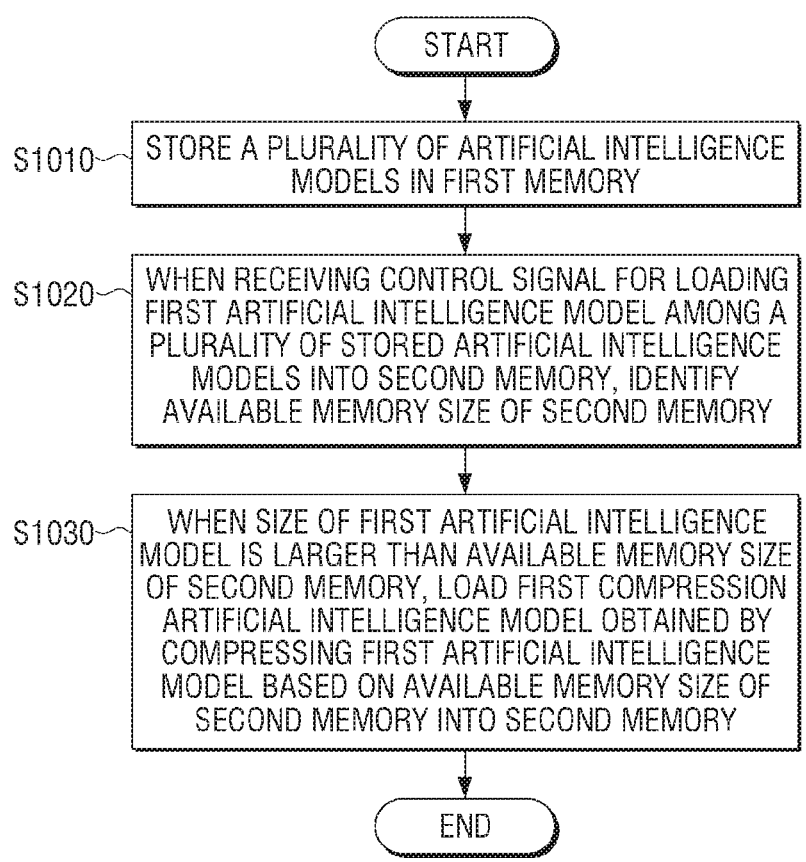
FIG. 10 is a flowchart to illustrate a method for controlling another electronic apparatus, according to an embodiment.

FIG. 10 is a flowchart to illustrate a method for controlling another electronic apparatus according to an embodiment.

The electronic apparatus 100 may store a plurality of artificial intelligence models in the first memory 110 at step S1010. As described above, a compression artificial intelligence model for each of the plurality of artificial intelligence models maybe stored together.

When receiving a control signal for loading the first artificial intelligence model among the plurality of stored artificial intelligence models in the second memory 120, the electronic apparatus 100 may identify the available memory size of the second memory at step S1020. The control signal for loading the first artificial intelligence model in the second memory 120 may be received when a user command is input. The control signal for loading the first artificial intelligence model in the second memory 120 may be received when a predetermined condition such as a specific situation, a history, a context, etc., is satisfied.

When the size of the first artificial intelligence model is greater than the available memory size of the second memory 120, the electronic apparatus 100 may load the first compression artificial intelligence model obtained by compressing the first artificial intelligence model based on the available memory size in the second memory 120 at step S1030.

Figure 11:
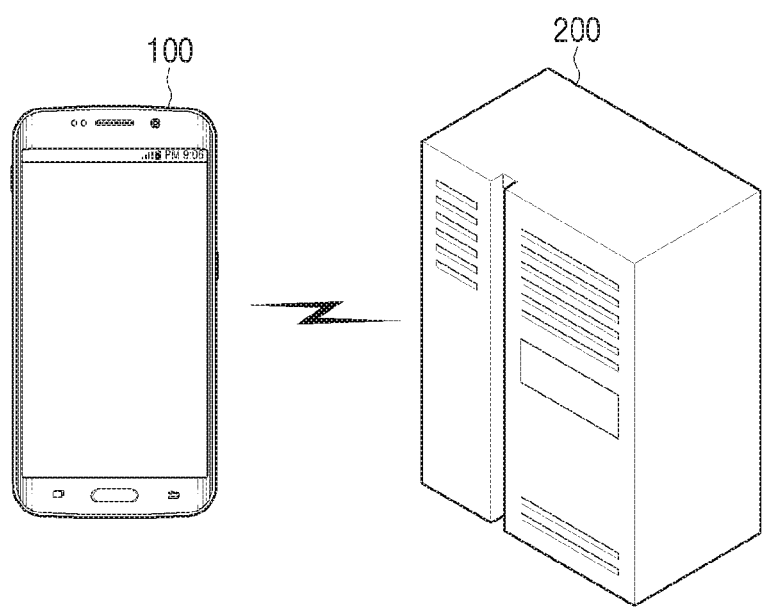
FIG. 11 is an example view to illustrate operations of an electronic apparatus and an external server, according to an embodiment.

FIG. 11 is an example view to illustrate operations of an electronic apparatus and an external server according to an embodiment.

As described above, the compressed artificial intelligence model may be obtained by the electronic apparatus 100, but is not limited thereto. The electronic apparatus 100 may download and obtain the compressed artificial intelligence model from the external server 200.

The electronic apparatus 100 may directly obtain the artificial intelligence model compressed as needed, or download the artificial intelligence model from the external server 200. For example, when the artificial intelligence model to be compressed has a predetermined size or more, so that the amount of calculations necessary for compressing the artificial intelligence model to be compressed by the electronic apparatus 100 is more than a predetermined amount of calculations, the electronic apparatus 100 may download the compressed artificial intelligence model from the external server 200. Regardless of the size of the artificial intelligence model to be compressed, if the amount of calculations necessary for compressing the artificial intelligence model is more than the predetermined amount of calculations, the electronic apparatus 100 may download the artificial intelligence model from the external server 200. In addition, the electronic apparatus 100 may identify whether the electronic apparatus compresses the artificial intelligence model, or download the artificial intelligence model from the external server 200 based on the processor share rate.

FIG. 12 is a flowchart to illustrate an operation of an electronic apparatus to download a compressed artificial intelligence model from an external server according to an embodiment.

The electronic apparatus 100 may receive a control signal for compressing an artificial intelligence model at step S1210. The control signal for compressing an artificial intelligence model may be received under various conditions. For example, when receiving an artificial intelligence model from the external server 200, the electronic apparatus 100 may receive a control signal for compressing the downloaded artificial intelligence model. When the control signal for loading the artificial intelligence model to the second memory 120 is received, and the artificial intelligence model is compressed according to the control signal for loading the artificial intelligence model to the second memory 120, the electronic apparatus 100 may receive a control signal for compressing the artificial intelligence model.

The electronic apparatus 100 may identify whether to compress an artificial intelligence model in the electronic apparatus 100 or the external server 200 at the time of downloading the artificial intelligence model, or if there is a need for compressing an artificial intelligence model, may identify whether to compress the artificial intelligence model in the electronic apparatus 100, or the external server 200.

The electronic apparatus 100 may identify whether to compress an artificial intelligence model in the electronic apparatus 100 at step S1220. When it is identified to compress an artificial intelligence model in the electronic apparatus 100 at step S1220-Y, the electronic apparatus 100 may compress an artificial intelligence model and store the compressed artificial intelligence model in the first memory 110, or load the artificial intelligence model in the second memory 120 at step S1250. When it is identified to compress an artificial intelligence model in the external server 200 at step S1220-N, the electronic apparatus 100 may request the external server 200 to compress an artificial intelligence model at step S1230. As described above, when an artificial intelligence model to be compressed is a predetermined size or more, and the amount of calculations necessary for compressing an artificial intelligence model to be compressed by the electronic apparatus is equal to or more than a predetermined amount of calculations, the electronic apparatus 100 may request the external server 200 to compress an artificial intelligence model. When the amount of calculation necessary for compressing an artificial intelligence model is equal to or more than the predetermined amount of calculation regardless of the size of the artificial intelligence model to be compressed, the electronic apparatus 100 may request the external server 20 to compress an artificial intelligence model. The electronic apparatus 100 may identify whether to compress an artificial intelligence model, or to request the external server 200 to compress an artificial intelligence model based on the process share rate.

The electronic apparatus 100 may download the compressed artificial intelligence model from the external server 200 and store the artificial intelligence model in the first memory 110, or load the artificial intelligence model to the second memory 120 at step S1240.

While the disclosure has been described such that all elements of an embodiment are coupled to one another or operate in combination, it is to be understood that the disclosure is not limited to the disclosed embodiments. That is, within the scope of the disclosure, all of the elements may be selectively coupled to one another in one or more of combinations. In addition, although all of the elements may be implemented as one independent hardware, some or all of the elements may be selectively combined to embody as a computer program including a program module performing a part or all of the functions in one or a plurality of hardware.

At least part of devices (e.g., modules or functions) or methods (e.g., operations) according to various embodiments may be embodied as one or more instructions stored in a non-transitory computer readable media in the form of a program module. When one or more instructions is/are executed by a processor (e.g., the processor 130), the processor may perform a function corresponding to the one or more instructions.

The program may be stored in a computer-readable recording medium and read and executed by a computer to implement one or more embodiments.

The non-transitory readable recording medium refers to a medium that semi-permanently stores data and is capable of being read by a device, but also includes a register, a cache, a buffer, etc., but does not include transmission media such as signal, current, or the like.

Specifically, the above-described programs may be stored in a non-transitory readable recording medium such as a CD, a DVD, a hard disk, a Blu-ray disk, a USB, an internal memory (e.g., memory 150), a memory card, a ROM, or a RAM.

Also, the method according to the disclosed embodiments may be provided as a computer program product.

A computer program product may include an S/W program, a computer readable storage medium in which the S/W program is stored, or a merchandise traded between a seller and a purchaser.

For example, a computer program product may include a product in the form of S/W program (e.g., a downloadable app) distributed on-line through a manufacture and an electronic market (e.g., google play store, app store, etc.). In the case of on-line distribution, at least a portion of the S/W program may be stored in a storage medium, or temporarily created. In this case, a storage medium may be a storage medium of a server of a manufacturer or an electronic market, or a relay server.

Although embodiments have been shown and described, it will be appreciated by those skilled in the art that changes may be made to these embodiments without departing from the principles and spirit of the disclosure. Accordingly, the scope of the disclosure is not construed as being limited to the described embodiments, but is defined by the appended claims as well as equivalents thereto.

What is claimed is:

1. A method for controlling an electronic apparatus, the method comprising:
storing a plurality of artificial intelligence models in a first memory;
based on receiving a control signal for loading a first artificial intelligence model among the plurality of stored artificial intelligence models into a second memory, identifying an available memory size of the second memory;
based on a size of the first artificial intelligence model being smaller than the available memory size of the second memory, loading the first artificial intelligence model into the second memory;
based on the size of the first artificial intelligence model being larger than the available memory size of the second memory, obtaining a first compression artificial intelligence model by compressing the first artificial intelligence model based on the available memory size of the second memory;
identifying whether a performance of the first compression artificial intelligence model satisfies a predetermined condition; and
based on the performance of the first compression artificial intelligence model satisfying the predetermined condition, loading the first compression artificial intelligence model into the second memory.

2. The method as claimed in claim 1, further comprising: based on the performance of the first compression artificial intelligence model not satisfying the predetermined condition, obtaining a second compression artificial intelligence model obtained by compressing the first artificial intelligence model using a different method than the first compression artificial intelligence model, and loading the second compression artificial intelligence model into the second memory.

3. The method as claimed in claim 2, wherein the performance of the first compression artificial intelligence model is any one or any combination of a processor share rate of the first compression artificial intelligence model, the size of the first compression artificial intelligence model, and an accuracy of the first compression artificial intelligence model.

4. The method as claimed in claim 2, further comprising:
based on a plurality of compression artificial intelligence models obtained by compressing the first artificial intelligence model using a plurality of methods not satisfying the predetermined condition, displaying a message notifying that the predetermined condition is not satisfied.

5. A method for controlling an electronic apparatus, the method comprising:
- storing a plurality of artificial intelligence models in a first memory;
- based on receiving a control signal for loading a first artificial intelligence model among the plurality of stored artificial intelligence models into a second memory, identifying an available memory size of the second memory;
- based on a size of the first artificial intelligence model being larger than the available memory size of the second memory, obtaining a first compression artificial intelligence model by compressing the first artificial intelligence model based on the available memory size of the second memory, and loading the first compression artificial intelligence model into the second memory; and
- based on the available memory size of the second memory being changed, obtaining a third compression artificial intelligence model by compressing the first artificial intelligence model based on the changed available memory size, and loading the third compression artificial intelligence model.

6. A method for controlling an electronic apparatus, the method comprising:
- storing a plurality of artificial intelligence models in a first memory;
- based on receiving a control signal for loading a first artificial intelligence model among the plurality of stored artificial intelligence models into a second memory, identifying an available memory size of the second memory;
- based on a size of the first artificial intelligence model being larger than the available memory size of the second memory, obtaining a first compression artificial intelligence model by compressing the first artificial intelligence model based on the available memory size of the second memory, and loading the first compression artificial intelligence model into the second memory; and
- based on receiving a control signal for loading a second artificial intelligence model into the second memory, according to the available memory size of the second memory, loading a compression artificial intelligence model for the first artificial intelligence model obtained by compressing the first artificial intelligence model, and a compression artificial intelligence model for the second artificial intelligence model obtained by compressing the second artificial intelligence model.

7. A method for controlling an electronic apparatus, the method comprising:
- storing a plurality of artificial intelligence models in a first memory;
- based on receiving a control signal for loading a first artificial intelligence model among the plurality of stored artificial intelligence models into a second memory, identifying an available memory size of the second memory;
- based on a size of the first artificial intelligence model being larger than the available memory size of the second memory, obtaining a first compression artificial intelligence model by compressing the first artificial intelligence model based on the available memory size of the second memory, and loading the first compression artificial intelligence model into the second memory;
- based on a plurality of artificial intelligence models being loaded in the second memory, identifying a number of times of use of the plurality of artificial intelligence models loaded in the second memory, and
- based on the identified number of times of use, loading a compression artificial intelligence model for at least one of the plurality of artificial intelligence models.

8. A method for controlling an electronic apparatus, the method comprising:
- storing a plurality of artificial intelligence models in a first memory;
- based on receiving a control signal for loading a first artificial intelligence model among the plurality of stored artificial intelligence models into a second memory, identifying an available memory size of the second memory;
- based on a size of the first artificial intelligence model being larger than the available memory size of the second memory, obtaining a first compression artificial intelligence model by compressing the first artificial intelligence model based on the available memory size of the second memory, and loading the first compression artificial intelligence model into the second memory; and
- displaying a user interface (UI) for receiving a performance of at least one of the plurality of artificial intelligence models,
- wherein the first compression artificial intelligence model is an artificial intelligence model compressed based on a performance input through the UI.

9. The method as claimed in claim 1, wherein the storing further comprises storing a plurality of compressed artificial intelligence models for the first artificial intelligence model in the first memory.

10. The method as claimed in claim 1, wherein the first artificial intelligence model is compressed using any one or any combination of Pruning, Quantization, Decomposition, and Knowledge Distillation.

11. An electronic apparatus, comprising:
- a first memory configured to store a plurality of artificial intelligence models;
- a second memory configured to load at least one of the plurality of artificial intelligence models stored in the first memory; and
- a processor configured to:
  - based on receiving a control signal for loading a first artificial intelligence model among the plurality of stored artificial intelligence models into the second memory, identify an available memory size of the second memory,
  - based on a size of the first artificial intelligence model being smaller than the available memory size of the second memory, load the first artificial intelligence model into the second memory,
  - based on the size of the first artificial intelligence model being larger than the available memory size of the second memory, control to obtain a first compression artificial intelligence model by compressing the first artificial intelligence model based on the available memory size of the second memory,
  - identify whether a performance of the first compression artificial intelligence model satisfies a predetermined condition, and
  - based on the performance of the first compression artificial intelligence model satisfying the predetermined condition, load the first compression artificial intelligence model into the second memory.

12. The electronic apparatus as claimed in claim 11, wherein the processor is further configured to:
based on the performance of the first compression artificial intelligence model not satisfying the predetermined condition, control to obtain a second compression artificial intelligence model by compressing the first artificial intelligence model using a different method than the first compression artificial intelligence model, and load the second compression artificial intelligence model into the second memory.

13. The electronic apparatus as claimed in claim 12, wherein the performance of the first compression artificial intelligence model is any one or any combination of a processor share rate of the first compression artificial intelligence model, the size of the first compression artificial intelligence model, and an accuracy of the first compression artificial intelligence model.

14. The electronic apparatus as claimed in claim 12, further comprising:
a display,
wherein the processor is further configured to, based on a plurality of compression artificial intelligence models obtained by compressing the first artificial intelligence model using a plurality of methods not satisfying the predetermined condition, control the display to display a message notifying that the predetermined condition is not satisfied.

15. An electronic apparatus, comprising:
a first memory configured to store a plurality of artificial intelligence models;
a second memory configured to load at least one of the plurality of artificial intelligence models stored in the first memory; and
a processor configured to:
based on receiving a control signal for loading a first artificial intelligence model among the plurality of stored artificial intelligence models into the second memory, identify an available memory size of the second memory, and
based on a size of the first artificial intelligence model being larger than the available memory size of the second memory, control to obtain a first compression artificial intelligence model by compressing the first artificial intelligence model based on the available memory size of the second memory, and load the first compression artificial intelligence model into the second memory,
wherein the processor is further configured to, based on the available memory size of the second memory being changed, control to obtain a third compression artificial intelligence model by compressing the first artificial intelligence model based on the changed available memory size, and load the third compression artificial intelligence model.

16. An electronic apparatus, comprising:
a first memory configured to store a plurality of artificial intelligence models;
a second memory configured to load at least one of the plurality of artificial intelligence models stored in the first memory; and
a processor configured to:
based on receiving a control signal for loading a first artificial intelligence model among the plurality of stored artificial intelligence models into the second memory, identify an available memory size of the second memory, and
based on a size of the first artificial intelligence model being larger than the available memory size of the second memory, control to obtain a first compression artificial intelligence model by compressing the first artificial intelligence model based on the available memory size of the second memory, and load the first compression artificial intelligence model into the second memory,
wherein the processor is further configured to, based on a control signal for loading a second artificial intelligence model into the second memory being received, according to the available memory size of the second memory, control to load a compression artificial intelligence model for the first artificial intelligence model obtained by compressing the first artificial intelligence model, and a compression artificial intelligence model for the second artificial intelligence model obtained by compressing the second artificial intelligence model.

17. An electronic apparatus, comprising:
a first memory configured to store a plurality of artificial intelligence models;
a second memory configured to load at least one of the plurality of artificial intelligence models stored in the first memory; and
a processor configured to:
based on receiving a control signal for loading a first artificial intelligence model among the plurality of stored artificial intelligence models into the second memory, identify an available memory size of the second memory, and
based on a size of the first artificial intelligence model being larger than the available memory size of the second memory, control to obtain a first compression artificial intelligence model by compressing the first artificial intelligence model based on the available memory size of the second memory, and load the first compression artificial intelligence model into the second memory,
wherein the processor is further configured to, based on a plurality of artificial intelligence models being loaded in the second memory, identify a number of times of use of the plurality of artificial intelligence models loaded in the second memory, and load a compression artificial intelligence model for at least one of the plurality of artificial intelligence models based on the identified number of times of use.

18. An electronic apparatus, comprising:
a display;
first memory configured to store a plurality of artificial intelligence models;
a second memory configured to load at least one of the plurality of artificial intelligence models stored in the first memory; and
a processor configured to:
based on receiving a control signal for loading a first artificial intelligence model among the plurality of stored artificial intelligence models into the second memory, identify an available memory size of the second memory, and
based on a size of the first artificial intelligence model being larger than the available memory size of the second memory, control to obtain a first compression artificial intelligence model by compressing the first artificial intelligence model based on the available memory size of the second memory, and load the first compression artificial intelligence model into the second memory, wherein the processor is further configured to control the display to display a user interface (UI) for receiving a performance of at least one of the plurality of artificial intelligence models, and wherein the first compression artificial intelligence model is an artificial intelligence model compressed based on a performance input through the UI.

19. The electronic apparatus as claimed in claim 11, wherein the processor is further configured to control the first memory to store a plurality of compressed artificial intelligence models for the first artificial intelligence model in the first memory.

20. The electronic apparatus as claimed in claim 11, wherein the first artificial intelligence model is compressed using any one or any combination of Pruning, Quantization, Decomposition, and Knowledge Distillation.

* * * * *